(12) United States Patent
Yonetani

(10) Patent No.: US 11,580,453 B2
(45) Date of Patent: Feb. 14, 2023

(54) ADAPTIVE CO-DISTILLATION MODEL

(71) Applicant: OMRON Corporation, Kyoto (JP)

(72) Inventor: Ryo Yonetani, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 401 days.

(21) Appl. No.: 16/802,882

(22) Filed: Feb. 27, 2020

(65) Prior Publication Data

US 2021/0272011 A1    Sep. 2, 2021

(51) Int. Cl.
| | |
|---|---|
| *H04L 29/06* | (2006.01) |
| *G06N 20/00* | (2019.01) |
| *G06F 17/18* | (2006.01) |
| *H04L 9/00* | (2022.01) |
| *G06N 3/04* | (2023.01) |
| G06N 3/084 | (2023.01) |
| G06N 20/10 | (2019.01) |

(52) U.S. Cl.
CPC .............. *G06N 20/00* (2019.01); *G06F 17/18* (2013.01); *G06N 3/0454* (2013.01); *H04L 9/008* (2013.01); *G06N 3/084* (2013.01); *G06N 20/10* (2019.01)

(58) Field of Classification Search
CPC ......... G06F 17/18; H04L 9/008; G06N 20/00; G06N 3/0454; G06N 3/084; G06N 20/10; G06N 20/20; G06N 3/0445
See application file for complete search history.

(56) References Cited

U.S. PATENT DOCUMENTS

2019/0385711 A1\* 12/2019 Shriberg .............. A61B 5/4803

OTHER PUBLICATIONS

Shin, S. et al., "Generative Knowledge Transfer for Neural Language Models," arXiv, 1608.04077v3, Feb. 28, 2017, 10 pages.
ISA Japan Patent Office, International Search Report and Written Opinion Issued in Application No. PCT/JP2021/005327, dated Apr. 27, 2021, WIPO, 7 pages.

\* cited by examiner

*Primary Examiner* — Joseph P Hirl
*Assistant Examiner* — Leynna Truvan
(74) *Attorney, Agent, or Firm* — Alleman Hall Creasman & Tuttle LLP

(57) ABSTRACT

A method for use with a computing device is provided. The method may include inputting an input data set into a first private artificial intelligence model generated using a first private data set and a second private artificial intelligence model generated using a second private data set. The method may further include receiving a first result data set from the first private artificial intelligence model and receiving a second result data set from the second private artificial intelligence model. The method may further include training an adaptive co-distillation model with the input data set and the first result data set. The method may further include training the adaptive co-distillation model with the input data set and the second result data set. The adaptive co-distillation model may not be trained on the first private data set or the second private data set.

18 Claims, 17 Drawing Sheets

FIG. 8

UNWEIGHTED VS. WEIGHTED LOSS FUNCTION SURFACE:

PUBLIC MODEL LEARNS LESS FROM TRAINING DATA SAMPLES IN PUBLIC DATA SET
THAT ARE DISSIMILAR TO ANY SAMPLES IN PRIVATE DATA SETS

ADAPTIVE CO-DISTILLATION MODEL

BACKGROUND

Computer models are used in various fields to enable computer systems to analyze data for a particular situation and make decisions based on the data. A wide variety of such models have been developed. For example, symbolic models such as expert systems and decision trees, and non-symbolic models such as neural networks and support vector machines, are well known. In machine learning, a model is trained on a data set, while in symbolic systems a model is typically designed heuristically, that is, using human decisions. With such a wide variety of models in use by different entities, opportunities for collaboration exist.

In distributed machine learning, a machine learning algorithm is trained using data distributed between multiple computing devices. Each of those computing devices may store its own set of training data that are used to locally train a machine learning model. Those machine learning models may then be combined into a centralized model. Distributed machine learning may be used, for example, when the machine learning models are trained using private data which the users of the computing devices do not want to send to a central server.

However, the inventors have identified the following technical shortcomings of the above-described methods of distributed machine learning. In the above-described methods of distributed machine learning, all the client machine learning models have the same model architecture. Thus, multiple client machine learning models with different architectures may not be combined into a central machine learning model. In addition, the users of the distributed client computing devices may desire to keep private the specific machine learning model architectures they use for the client machine learning models, for privacy reasons, competitive advantage, licensing or other legal constraints, etc. However, the above-described methods of distributed machine learning share the same model architecture among the distributed users, and thus do not enable client model architectures to be kept private. Thus, a technical challenge exists to provide an artificial intelligence system that promotes the technical integration of learnings of different artificial intelligence models developed by independent parties, while at the same time preserving the data privacy of the data on which each of those different artificial intelligence models were trained.

The field of industrial automation is one example of a technical field in which these shortcomings present a particular challenge. Various manufacturers have instrumented manufacturing equipment, such as robotic arms, conveyors, etc., with motion sensors and cameras, for example, that gather performance data from the manufacturing equipment during a manufacturing process. This performance data is used by each manufacturer to train artificial intelligence models that are used to operate the manufacturing equipment during future manufacturing processes. The above-discussed challenges of lack of interoperability between artificial intelligence models of different architectures and data privacy for data sets on which these different models have been trained, present potential barriers to the rapid growth and development of artificial intelligence models used in such industrial automation systems.

SUMMARY

According to one aspect of the present disclosure, a method for use with a computing device is provided. The method may include inputting an input data set into a first private artificial intelligence model that has been generated using a first private data set and a second private artificial intelligence model that has been generated using a second private data set. The method may further include receiving a first result data set from the first private artificial intelligence model as a result of applying the first private artificial intelligence model to the input data set. The method may further include receiving a second result data set from the second private artificial intelligence model as a result of applying the second private artificial intelligence model to the input data set. In a first training phase, the method may further include training an adaptive co-distillation model with the input data set as an input and the first result data set as a first target output. In a second training phase, the method may further include training the adaptive co-distillation model with the input data set as the input and the second result data set as a second target output. The adaptive co-distillation model may not be trained on the first private data set or the second private data set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 illustrates an example adaptive co-distillation model generation interface of a graphical user interface of the embodiment of FIG. 1.

DETAILED DESCRIPTION

Figure 1:
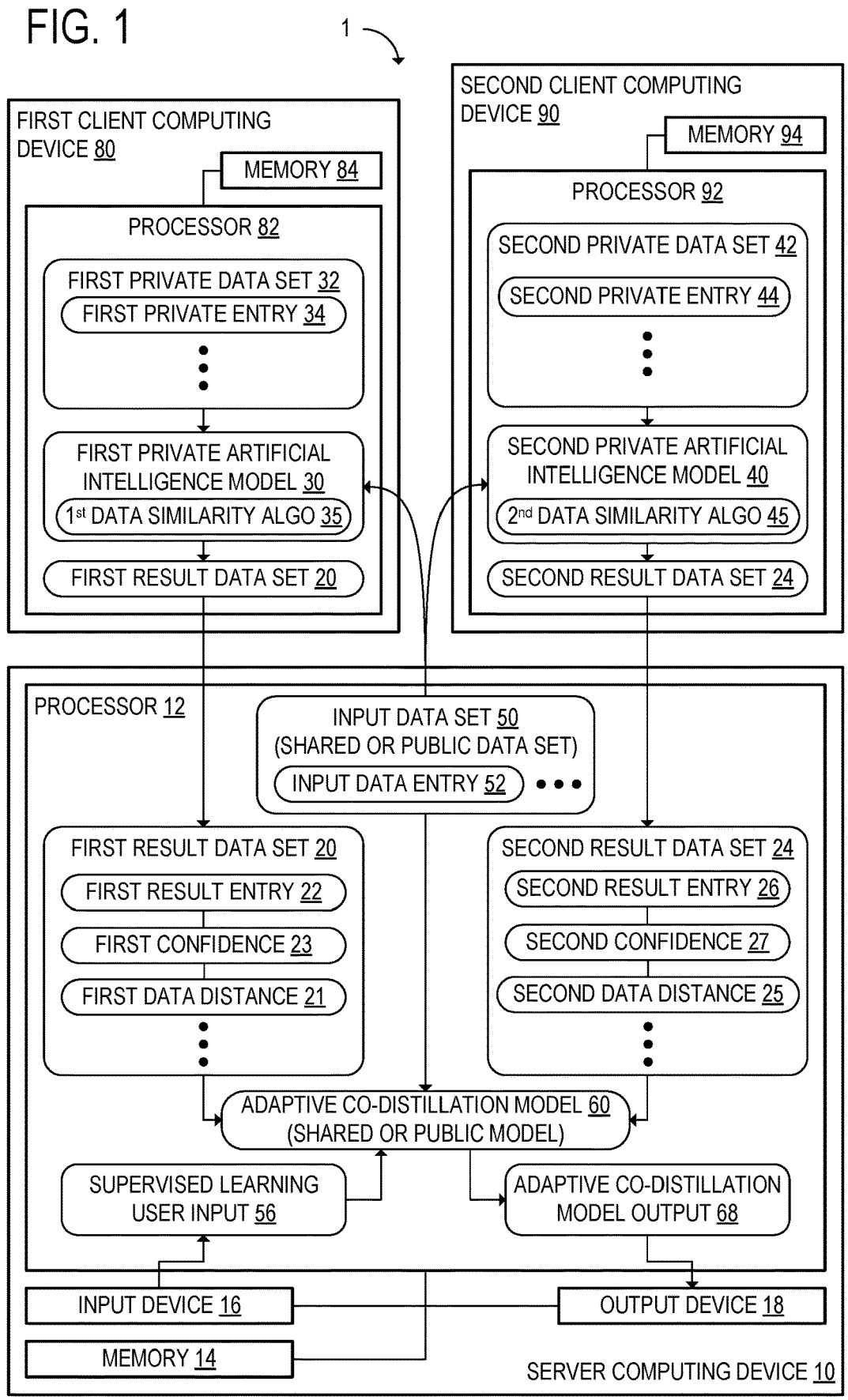
FIG. 1 schematically shows an example computing system at which an adaptive co-distillation model may be trained, according to one example embodiment.

In order to address the above issues, a computing system 1 is provided, according to one example embodiment shown in FIG. 1. As an overview, computing system 1 is configured to enable a public or shared artificial intelligence model to be trained to mimic the behavior of one or more private artificial intelligence models that have been generated using private data sets. This is accomplished by inputting data from a public or shared data set to each of the private artificial intelligence models and using the output of the private artificial intelligence models to train the public artificial intelligence model. A weighted loss function may be used to deemphasize the training effect of less relevant data in the public or shared data set, as explained in detail below. The weighted loss function may, for example, be an output weighted loss function or an input weighted loss function, as described below. By use of such a system, the learnings of each private artificial intelligence model can be shared while maintaining the privacy of the data in each private data set.

In the example of FIG. 1, the computing system 1 includes a server computing device 10, a first client computing device 80, and a second client computing device 90. The server computing device 10 may be configured to communicate with the first client computing device 80 and the second client computing device 90 via a network. Although only two client computing devices are shown in the example of FIG. 1, the server computing device 10 may be configured to communicate with more than two client computing devices in some embodiments. In some embodiments, the functions of the server computing device 10 may be distributed across a plurality of physical computing devices that are communicatively coupled.

The server computing device 10 may include a processor 12. In addition, the server computing device 10 may include memory 14, which may store instructions executable by the processor 12. The memory 14 may include volatile storage and/or non-volatile storage. The first client computing device 80 and the second client computing device 90 may also include respective processors 82 and 92 and memory 84 and 94. In some embodiments, the server computing device 10 may include one or more respective input devices 16 such as a keyboard, a mouse, a touchscreen, a trackpad, a microphone, an optical sensor, an accelerometer, or some other type of input device 16. The server computing device 10 may also include one or more respective output devices 18 such as a display, a speaker, a haptic feedback device, or some other type of output device 18. The first client computing device 80 and the second client computing device 90 may also include one or more respective input devices and/or one or more respective output devices.

The processor 12 of the server computing device 10 may be configured to transmit an input data set 50 to the first client computing device 80 and the second client computing device 90. Because the input data set 50 is shared between the server computing device, first computing device, and second computing device, each of which may be located at different entities, the input data set 50 may also be referred to as a shared data set, and in some cases may be a public data set. The input data set 50 may include a plurality of input data entries 52. As discussed in further detail below, the input data set 50 may be used as an input for a first private artificial intelligence model 30 executed at the first client computing device 80 and a second private artificial intelligence model 40 executed at the second client computing device 90, so that output may be produced by these models that can be used to train an adaptive co-distillation model 60 at the server computing device. The input data entries 52 included in the input data set 50 may be unlabeled data. Unlabeled data has the advantage of typically being more readily available than labeled data. In addition, unlabeled data does not specify what classification labels may be assigned to the input data entries 52 by the first private artificial intelligence model 30 and the second private artificial intelligence model 40. In other embodiments, the input data set 50 may be a partially labeled data set in which a subset of the input data entries 52 have respective classification labels, as discussed in further detail below. By using unlabeled or partially labeled data in the input data set 50, the private artificial intelligence models are free to classify the data in the input data set 50 according to classifications known to each private model and not included in the input data set 50, for example.

As shown in the example of FIG. 1, the first private artificial intelligence model 30 has been generated using a first private data set 32. The first private data set 32 may include a plurality of first private entries 34, which may include a plurality of example inputs and corresponding example outputs for the first private artificial intelligence model 30. The first private artificial intelligence model 30 may be a machine learning model which is trained using the first private data set 32 as a training data set. Alternatively, the first private artificial intelligence model may be a heuristic model, such as a symbolic artificial intelligence model, that is programmed based on the first private data set 32 without using machine learning techniques. In some embodiments, the first private artificial intelligence model 30 may have been generated prior to receiving the input data set 50 such that the input data set 50 is a runtime input for the first private artificial intelligence model 30. Since the first private artificial intelligence model 30 is generated at the first client computing device 80, the first private data set 32 does not have to be transmitted to the server computing device 10, and may be retained as a private data set.

The second private artificial intelligence model 40, as shown in the example of FIG. 1, has been generated using a second private data set 42. The second private data set 42 may include a plurality of second private entries 44, which may include a plurality of example inputs and corresponding example outputs for the second private artificial intelligence model 40. In embodiments in which the second private artificial intelligence model 40 is a machine learning model, the second private artificial intelligence model 40 may be trained using the second private data set 42 as a training data set. Alternatively, the second private artificial intelligence model 40 may be a heuristic model that is programmed based on the second private data set 42 without using machine learning model training techniques. Similarly to the first private artificial intelligence model 30, the second private artificial intelligence model 40 may have been generated using the second private data set 42 prior to receiving the input data set 50.

In some embodiments, the first private artificial intelligence model 30 may have a first model architecture, and the second private artificial intelligence model 40 may have a second model architecture that is different from the first model architecture. For example, each of the first private artificial intelligence model 30 and the second private artificial intelligence model 40 may be a deep neural network, a kernel machine, or a random forest. When a deep neural network is used for either the first private artificial intelligence model 30 or the second private artificial intelligence model 40, the deep neural network may, for example, be a multi-layer perceptron, a convolutional neural network, a recurrent neural network, or some other type of deep neural network. A different type or architecture of deep neural network may be used in each of the private artificial intelligence models, if desired. When a kernel machine is used for the first private artificial intelligence model 30 and/or the second private artificial intelligence model 40, the kernel machine may be a support-vector machine or some other type of kernel machine. The difference between the first model architecture and the second model architecture may be a difference in the type of machine learning algorithm used or may alternatively be a difference in parameters such as number of neurons or number of layers when the same type of machine learning algorithm is used.

Figure 2:
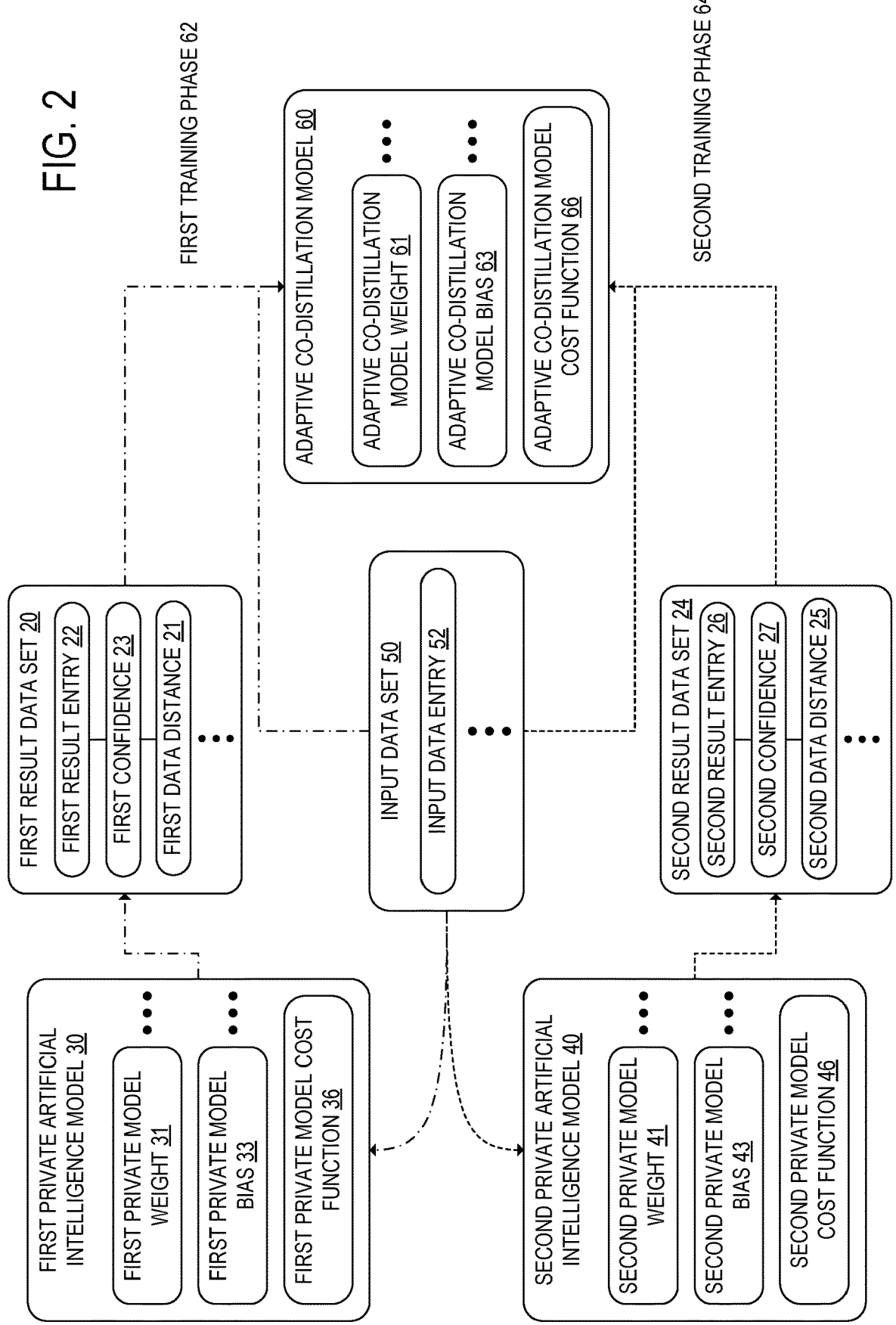
FIG. 2 shows the training of the adaptive co-distillation model in an example in which the adaptive co-distillation model is a deep neural network, according to the embodiment of FIG. 1.

FIG. 2 shows a first private artificial intelligence model 30 and a second private artificial intelligence model 40 that are both deep neural networks. The first private artificial intelligence model 30 has a plurality of first private model weights 31 of connections between its neurons. In addition, the first private artificial intelligence model 30 has a respective first private model bias 33 for each neuron. The first private artificial intelligence model 30 may be trained via a first training algorithm 100 (shown in FIG. 5) such as backpropagation with stochastic gradient descent using pairs of example inputs and corresponding example outputs included in the first private data set 32. In such an example, the first private model may use a cost function 36 that employs a weighted loss function. The weighted loss function may be an output weighted loss function as shown and described in relation to FIG. 11A or an input weighted loss function as shown and described in relation to FIG. 11B. The cost function 36 is used for backpropagation during machine learning and may be a mean squared error cost function, for example. Alternatively, another suitable cost function may be used, such as a cross-entropy cost function, exponential cost function, etc., as described below. The first private artificial intelligence model 30 may alternatively be trained using other methods such as coordinate descent or subgradient descent.

The second private artificial intelligence model 40 shown in FIG. 2 has a plurality of second private model weights 41 of connections between its neurons. In addition, the second private artificial intelligence model 40 has a respective second private model bias 43 for each neuron. As in the example provided above for the first private artificial intelligence model 30, the second private artificial intelligence model 40 may be trained via a second training algorithm 102 (shown in FIG. 5) using backpropagation with stochastic gradient descent. The second private model cost function 46 when backpropagation is used may be a mean squared error cost function or any other suitable cost function, such as a cross-entropy cost function, exponential cost function, etc. Other training methods such as coordinate descent or subgradient descent may alternatively be used to train the second private artificial intelligence model 40.

Returning to FIG. 1, the first client computing device 80 may generate a first result data set 20 as a result of applying the first private artificial intelligence model 30 to the input data set 50. The first result data set 20 may include a plurality of first result entries 22. In some embodiments, the first result data set 20 may further include a plurality of first confidences 23 associated with the first result entries 22. For example, when each of the first result entries 22 is selected from a list of predefined potential outputs, the first result data set 22 may include estimated probabilities of each of those potential outputs as the first confidences 23. In some embodiments, each of the first result entries 22 may be a vector of a plurality of first confidences 23. Further, the first result data set 20 may include a plurality of first data distances 21, each of which for example may be a training data distance between a corresponding input data entry 52 in the input data set 50 and the first private data set 32, as computed by the first data similarity algorithm 35. The first data distances 21 may be used in computing the weighted loss function, as described below in relation to FIG. 5, for example. Example data similarity algorithms are discussed in relation to FIG. 6.

Continuing with FIG. 1, in addition the second client computing device 90 may generate a second result data set 24 as a result of applying the second private artificial intelligence model 40 to the input data set 50. The second result data set 24 may include a plurality of second result entries 26. The second result data set 24 may further include a plurality of second confidences 27 respectively associated with the second result entries 26. The processor 82 of the first client computing device 80 and the processor 92 of the second client computing device 90 may be respectively configured to transmit the first result data set 20 and the second result data set 24 to the server computing device 10. Further, the second result data set 24 may include a plurality of second data distances 25, each of which for example may be a training data distance between a corresponding input data entry 52 in the input data set 50 and the second private data set 44, as computed by the second data similarity algorithm 45. It will be appreciated that the first and second data similarity algorithms 35, 45 may be the same or different algorithms, as desired. The second data distances 25 may also be used in computing the weighted loss function, as described below in relation to FIG. 5, for example.

Continuing with FIG. 1, the processor 12 of the server computing device 10 may be further configured to train an adaptive co-distillation model 60 with the input data set 50 as an input and the result data set 20 (in particular, the first data entries 22 of the first data set 20) as a first target output. The first confidences 23 may also be included in the first target output during training of the adaptive co-distillation model 60. The adaptive co-distillation model 60 may be a machine learning model such as a deep neural network, a kernel machine, or a random forest, or an algorithm that is designed heuristically by a person, for example. In the example of FIG. 2, the adaptive co-distillation model 60 is a deep neural network having a plurality of adaptive co-distillation model weights 61 between its neurons. The adaptive co-distillation model 60 may also have a respective adaptive co-distillation model bias 63 for each of the neurons. Training using the first result data set 20 may be performed during a first training phase 62. The adaptive co-distillation model 60 may, for example, be trained via stochastic gradient descent with an adaptive co-distillation model cost function 66 such as a mean squared error cost function. Alternatively, some other cost function may be used as discussed above. In some embodiments, instead of stochastic gradient descent, some other method of training the adaptive co-distillation model 60 may be used, such as coordinate descent or subgradient descent.

In a second training phase 64, the processor 12 may be further configured to train the adaptive co-distillation model 60 with the input data set 50 as the input and the second result data set 24 as a second target output. The second training phase 64 may be performed subsequently to the first training phase 62. Backpropagation with stochastic gradient descent may be used to train the adaptive co-distillation model 60 with the input data set 50 and the second result data set 24. In some embodiments, the adaptive co-distillation model cost function 66 used in the first training phase 62 may be reused in the second training phase 64. Alternatively, some other cost function may be used, as discussed above. As discussed below, the cost function may include a weighted loss function, which enables the adaptive co-distillation model to learn more from similar training data to the private training data in first and second private training data sets 32, 42.

The training of the adaptive co-distillation model 60 may be symbolically represented according to the following example. The input data set 50 may be expressed as $D_{dist}=(x_1, x_2, \ldots)$, where $x_n$ are the input data entries 52. The first private artificial intelligence model 30 and the second private artificial intelligence model 40 may each output respective model output values $\{M_i(x_n)|x_n \in D_{dist}\}$ to the server computing device 10, where $M_i$ are the model output values for each input value $x_n$ of $D_{dist}$. For classification models, the output value may be a classification and the model may also be configured to output a confidence value in addition to the classification. When the adaptive co-distillation model 60 is trained, the processor 12 of the server computing device 10 may be configured to minimize the following error expression:

$$WeightedLoss = \frac{1}{\sum_i w_{i,n}} \sum_i w_{i,n} [\text{Loss}(M_i(x_n), M_{server}(x_n))]$$

wherein the following terms have the following significance:
WeightedLoss: the cost function for $M_{server}$ that is minimized during training;
$M_{server}$: shared or public model (e.g., adaptive co-distillation model 60);
$M_i$: private model (e.g., first and second private artificial intelligence models 30, 40);
Loss: any suitable loss function, such as mean squared error, mean average error, mean bias error, support vector machine loss, cross entropy loss;
$x_n$ element n of shared or public data set $D_{dist}$ (e.g., input data set 50);
w: weighting factor; and $\frac{1}{\sum_i w_{i,n}} \sum_i w_{i,n}$: weighted average of the weighting factor.

weighted average of the weighting factor.

The above expression may be referred to as an output weighted loss function since the output of the loss function is weighted and may be contrasted to an input weighted loss function, described below. The weighting factor may be computed by data similarity algorithms 35, 45 that compare each $x_n$ in the public or shared data set $D_{dist}$ to all elements in the private data set $D_i$ with which $M_i$ was generated. The data similarity algorithms 35, 45 may further output respective weighting factors $w_{i,n}$ based on the data distance between the input data element $x_n$ and the public data set. The data similarity algorithms 35, 45 may compute the data distance in a single dimension (i.e., for a single independent variable) or in multi-dimensions (i.e., for multiple independent variables). Alternatively or in addition to basing the weighting factor $w_{i,n}$ on this data distance, the weighting factor $w_{i,n}$ may be based on another measure, such as a confidence value from the respective private artificial intelligence model 30, 40 or a human-specified input, as discussed below in relation to FIG. 8, for example. Suitable algorithms that may be used as data similarity algorithms 35, 45 include Euclidean distance, Manhattan distance, Minkowski distance, $n^{th}$ root similarity, cosine similarity, square rooted, and Jaccard distance, for example. The data similarity algorithm 35, 45 may first compute a data distance, and then may compute the weighting factor $w_{i,n}$ based on the data distance, for example, by normalizing the data distance to a value between zero and one (with higher distances approaching one), and then computing the weighting factor as equal to 1 minus the normalized data distance value. Since the training algorithm used to train the shared or public model $M_{server}$ (e.g., adaptive co-distillation model 60) attempts to minimize the weighted loss by learning more from greater loss, the shared or public model $M_{server}$ (e.g., adaptive co-distillation model 60) will learn more from data in the public data set that is similar to data in each private data set $M_i$ and will not learn as much from data in the public data set that is dissimilar to data in each private data set. The equation above is described in greater detail in reference to FIG. 9 below.

In the examples of FIGS. 1 and 2, the adaptive co-distillation model 60 is not trained on the first private data set 32 or the second private data set 42 directly and does not have access to them. Since the server computing device 10 does not have to receive the first private data set 32 or the second private data set 42 for training, the privacy of the private data sets may be maintained. In addition, since the processor 12 receives first result data set 20 and the second result data set 24 rather than the parameters of the first private artificial intelligence model 30 and the second private artificial intelligence model 40, the respective users of the first client computing device 80 and the second client computing device 90, who may, for example, be employees at respective companies or researchers at respective research entities, may also keep the architectures of their respective machine learning models private, thereby aiding privacy, competitive advantage, licensing or other legal constraints, etc. The use of a first result data set 20 and a second result data set 24 to train the adaptive co-distillation model 60 also allows the adaptive co-distillation model 60 to be generated for private artificial intelligence models that have different architectures. In contrast, existing methods of combining distributed machine learning models by forming a shared layer between the models are frequently unusable for combining models with different architectures.

In some embodiments, as shown in FIG. 1, the adaptive co-distillation model 60 may be trained at least in part via supervised learning. In such embodiments, during training of the adaptive co-distillation model 60, the processor 12 may be further configured to convey one or more adaptive co-distillation model outputs 68 produced by the adaptive co-distillation model 60 to a user via one or more output devices 18 of the server computing device 10. The processor 12 may be further configured to receive one or more supervised learning user inputs 56 via the one or more input devices 16. The one or more supervised learning user inputs 56 may include respective evaluations of the one or more adaptive co-distillation model outputs 68. For example, a supervised learning user input 56 may indicate whether the adaptive co-distillation model 60 has applied an accurate classification label to an input data entry 52 included in the input data set 50. Based on the supervised learning user input 56, the processor 12 may be further configured to update one or more parameters of the adaptive co-distillation model 60. For example, in embodiments in which the adaptive co-distillation model 60 is a deep neural network, the processor 12 may update one or more adaptive co-distillation model weights 61 and/or one or more adaptive co-distillation model biases 63.

Figure 3:
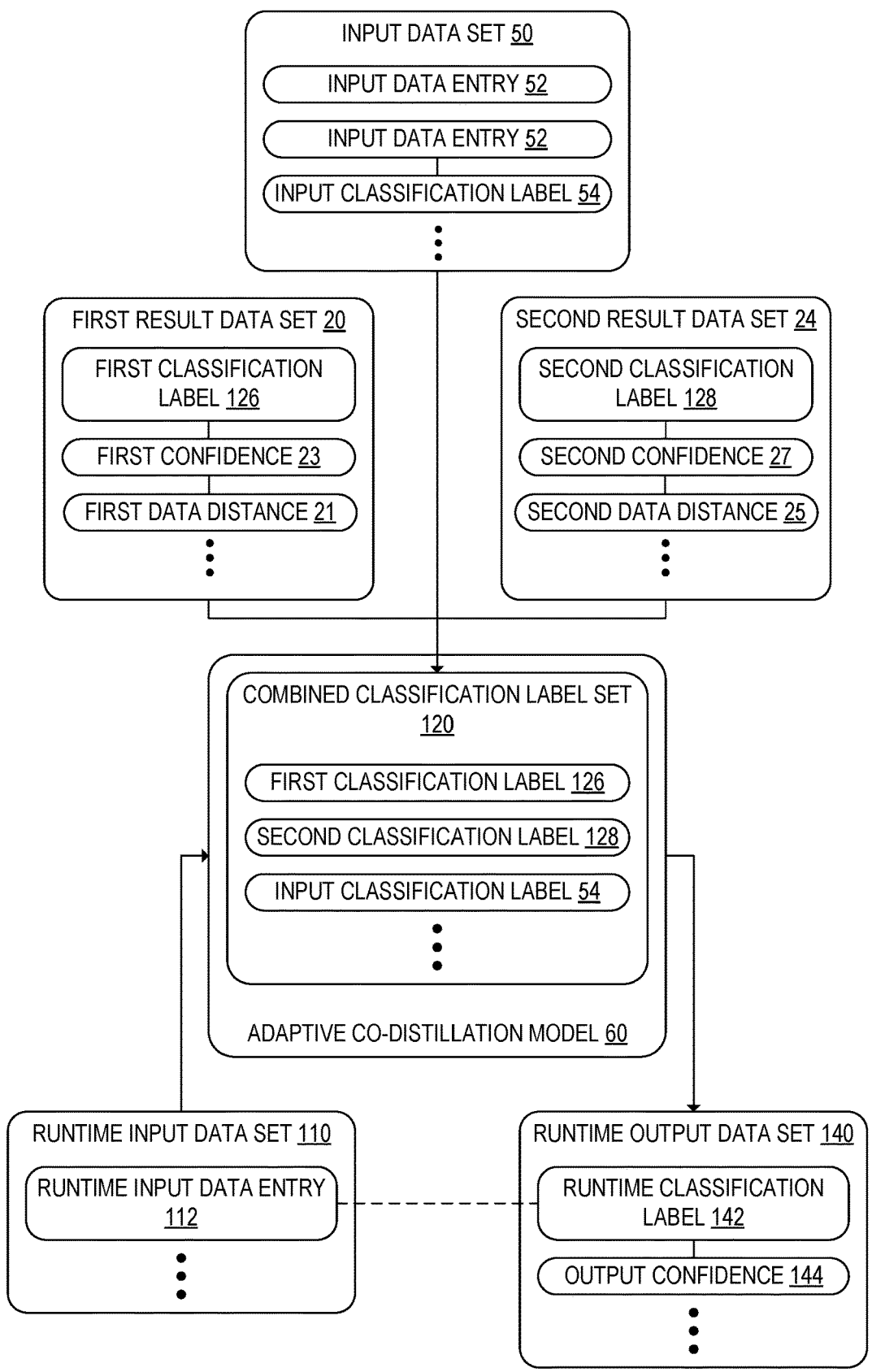
FIG. 3 shows the adaptive co-distillation model selecting classification labels from a combined classification label set, according to the embodiment of FIG. 1.

In some embodiments, as shown in FIG. 3, the adaptive co-distillation model 60 may be a classification model. In such embodiments, the first result data set 20 and the second result data set 24 may each include a respective plurality of classification labels. FIG. 3 shows a plurality of first classification labels 126 and a plurality of second classification labels 128 included in the first result data set 20 and the second result data set 24 respectively. The adaptive co-distillation model 60 in the example of FIG. 3 includes a combined classification label set 120 including each of the first classification labels 126 and the second classification labels 128. At runtime, the adaptive co-distillation model 60 may receive a runtime data set 110 including one or more runtime input data entries 112. In response to receiving the runtime input data set 110, the adaptive co-distillation model may be configured to output a runtime output data set 140 including one or more runtime classification labels 142 corresponding to the one or more runtime input data entries 112. In some embodiments, a plurality of runtime classification labels 142 may be matched to each runtime input data entry 112. In such embodiments, the adaptive co-distillation model 60 may be further configured to output a respective output confidence 144 for each of the runtime classification labels 142. Thus, the adaptive co-distillation model 60 may be configured to perform the classification tasks performed by both the first private artificial intelligence model 30 and the second private artificial intelligence model 40 without having been trained on the first private data set 32 or the second private data set 42.

As shown in FIG. 3, in embodiments in which the adaptive co-distillation model 60 is a classification model, the input data set 50 may be a partially labeled data set. In such embodiments, the input data set 50 may include a first subset of input data entries 52 that have respective input classification labels 54 and a second subset of input data entries 52 that do not have respective input classification labels 54. In such embodiments, the plurality of input classification labels 54 may be included in the combined classification label set 120.

Alternatively, in some embodiments, the adaptive co-distillation model 60 may be a regression model. In such embodiments, the first result data set 20 and the second result data set 24 may each include a respective plurality of numerical values. The first private artificial intelligence model 30 and the second private artificial intelligence model 40 may both be configured to map their respective inputs to corresponding first result entries 22 and second result entries 26 that include one or more numerical values. For example, the first private artificial intelligence model 30 and the second private artificial intelligence model 40 may each output a scalar numerical value, a vector of numerical values, or some other data structure including one or more numerical values. The adaptive co-distillation model 60 may, in such embodiments, perform a regression over the first result entries 22 and the second result entries 26 as functions of the input data entries 52.

Figure 4:
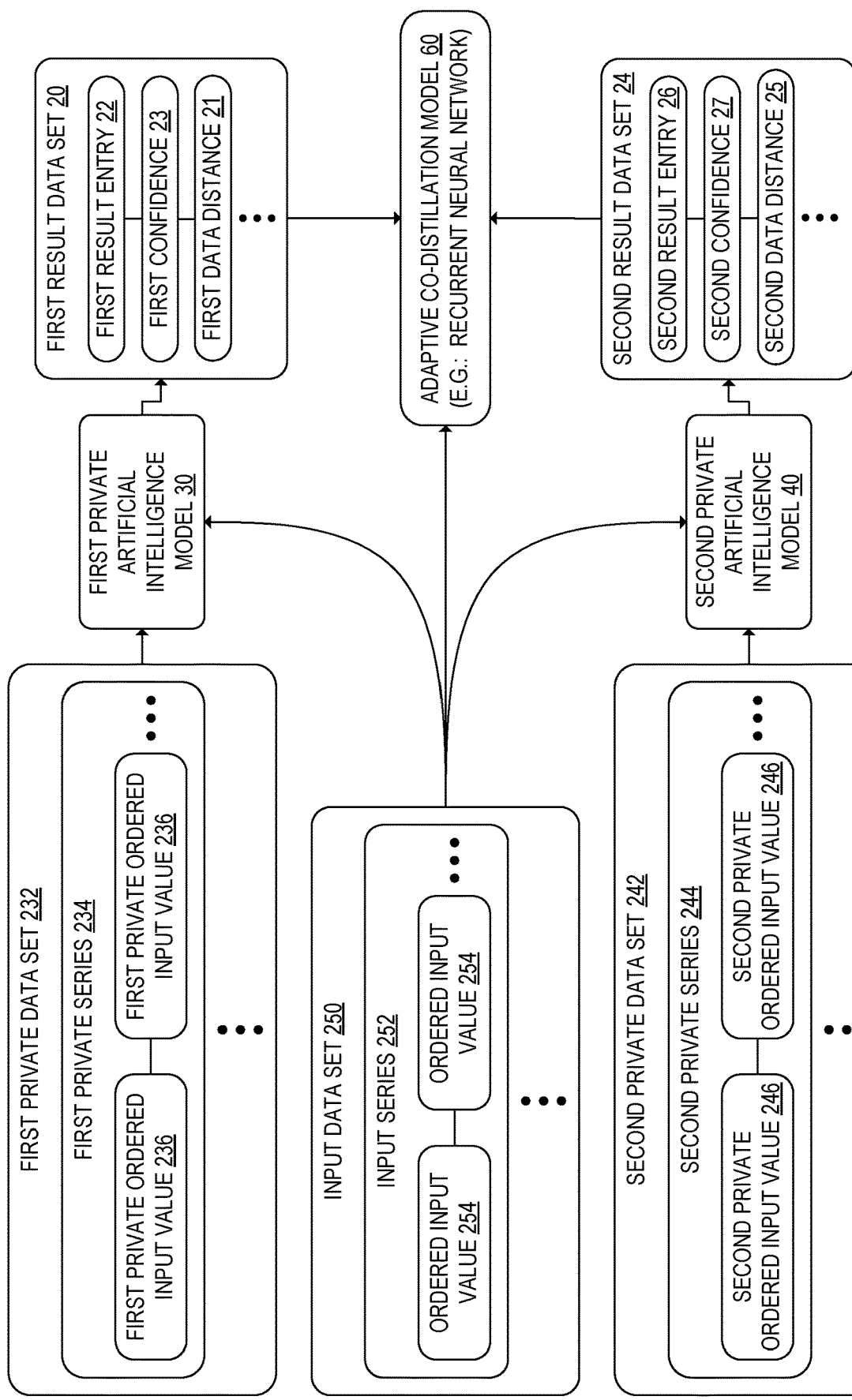
FIG. 4 shows the training of the adaptive co-distillation model using a plurality of series of ordered input values, according to the embodiment of FIG. 1.

In other embodiments, as shown in the example of FIG. 4, the adaptive co-distillation model 60 may be a recurrent neural network. In the example of FIG. 4, the input data set 250 includes a plurality of input series 252 that each include a plurality of ordered input values 254. The ordered input values 254 included in each input series 252 may be temporally ordered, spatially ordered, or ordered according to some other variable. In embodiments in which the adaptive co-distillation model 60 is a recurrent neural network, the first private data set 232 with which the first private artificial intelligence model 30 is trained may include a plurality of first private series 234. Each of the first private series 234 may include a plurality of first private ordered input values 236, which may be ordered according to the same variable as the ordered input values 254 included in the input series 252 of the input data set 250. In addition, the second private data set 242 may include a plurality of second private series 244. Each of the second private series 244 may include a plurality of second private ordered input values 246, which may be ordered according to the same variable as the ordered input values 254 included in the input series 252 of the input data set 250. Thus, the first private artificial intelligence model 30, the second private artificial intelligence model 40, and the adaptive co-distillation model 60 may each be generated using series data.

In some embodiments, the first result data set 20 or the second result data set 24 of FIG. 1 may be homomorphically encrypted. When the first result data set 20 or the second result data set 24 is homomorphically encrypted, one or more computations may be performed on the first result entries 22 or the second result entries 26 at the processor 12 of the server computing device 10 while the plaintext values of those entries remain hidden. The first result data set 20 or the second result data set 24 may be encrypted using a partially homomorphic, somewhat homomorphic, leveled fully homomorphic, or fully homomorphic encryption algorithm. For example, as a partially homomorphic scheme, the Paillier cryptosystem, Rivest-Shamir-Adleman (RSA), ElGamal scheme, or Goldwasser-Micali scheme may be used, and as a fully homomorphic scheme, the Brakerski-Gentry-Vaikuntanathan scheme or a variant may be used. Encryption of the first result data set 20 or the second result data set 24 may be performed at the first client computing device 80 or the second client computing device 90 respectively. The adaptive co-distillation model 60 may be trained with the homomorphically encrypted first result data set 20 or second result data set 24.

Figure 5:
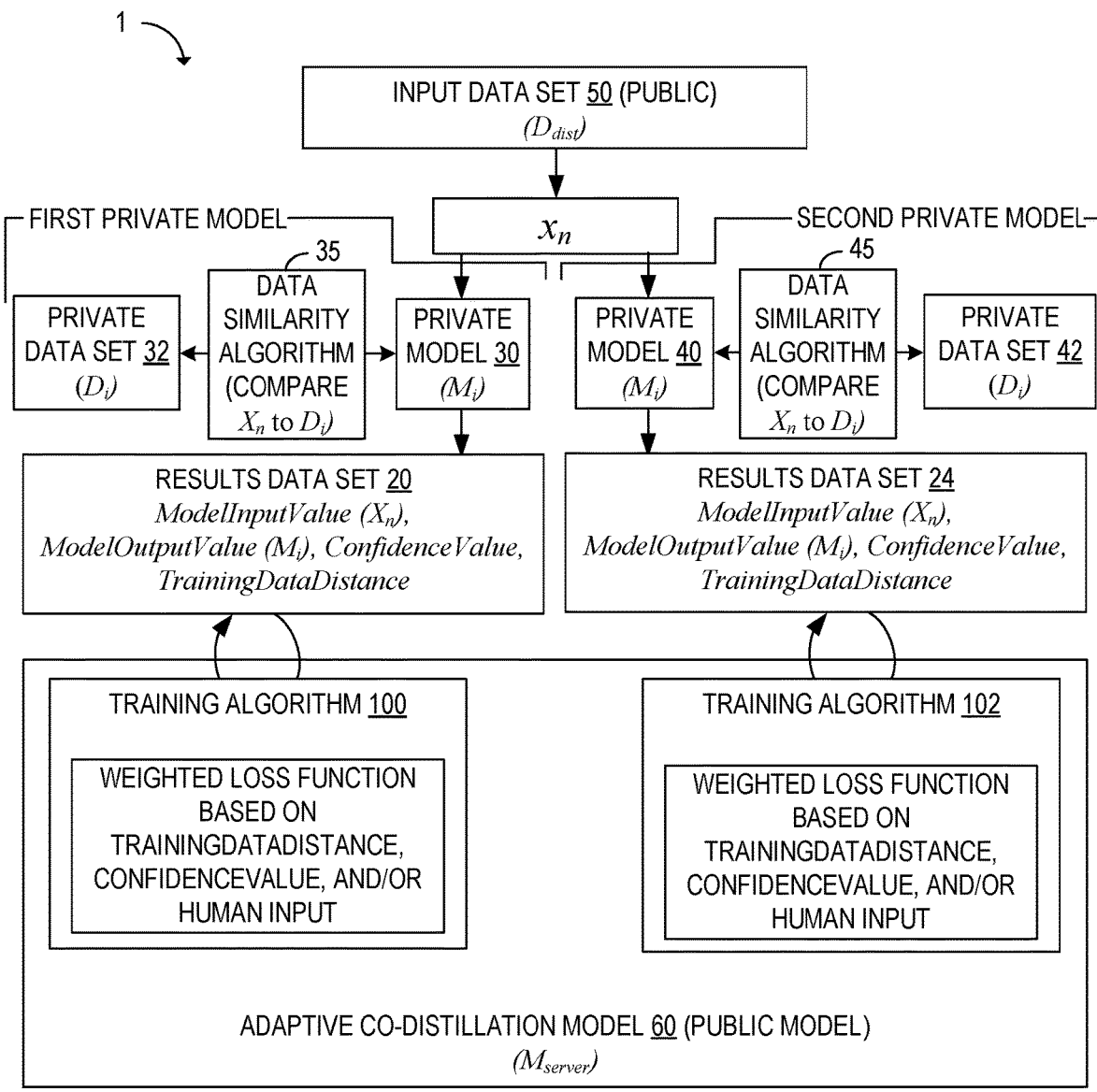
FIG. 5 is a schematic view that illustrates the use of a weighted loss function in the training of the adaptive co-distillation model of FIG. 1.

FIGS. 5-12 generally illustrate aspects of computer system 1 that enable the computer system 1 to utilize a weighted loss function. As illustrated in FIG. 5, each element $x_n$ of the input data set 50 ($D_{dist}$) may be provided as input into a plurality of private artificial intelligence models, such as first and second private artificial intelligence models 30, 40, after each of those models has been generated using a private data set, such as the first and second private data sets 32, 42 ($D_i$). At the time element $x_n$ is inputted to each of the private models 30, 40, a data similarity algorithm such as first and second data similarity algorithms 35, 45, compares the element $x_n$ to the data $D_i$ in private data sets 32, 40. The data similarity algorithm may be, for example, Euclidean distance, Manhattan distance, Minkowski distance, $n^{th}$ root similarity, cosine similarity, square rooted, and Jaccard distance, for example. The private models 30, 40 each output a respective result data set 20, 24 including a model output value ($M_i$), a confidence value in the model output value, and a training data distance, which is output by the similarity algorithm. The model input value ($x_n$) may also be passed through in the results data sets 20, 24, or may be retrieved directly from the input data set 50 at the server. The results data sets 20, 24 that are output by the private models 30, 40 are used in respective training phases to train the adaptive co-distillation model 60 (i.e., the shared or public model), by the first and second training algorithms 100, 102. The adaptive co-distillation model 60 is trained using $x_n$ as input and $M_i$ as its output, from each private model 30, 40. The first and second training algorithm 100, 102 may be selected form a wide variety of training algorithms, such as backpropagation with gradient descent, as described above. Each of the training algorithms 100, 102 has an associated weighted loss function 104, 106 that it attempts to minimize during training. The weighted loss functions may be based, for example, on the respective training data distances 21, 25 output from the corresponding similarity algorithms 35, 45, on the respective confidence values 23, 27 output from the associated private models 30, 40, and/or on human input, as in more detail explained below.

Figure 6:
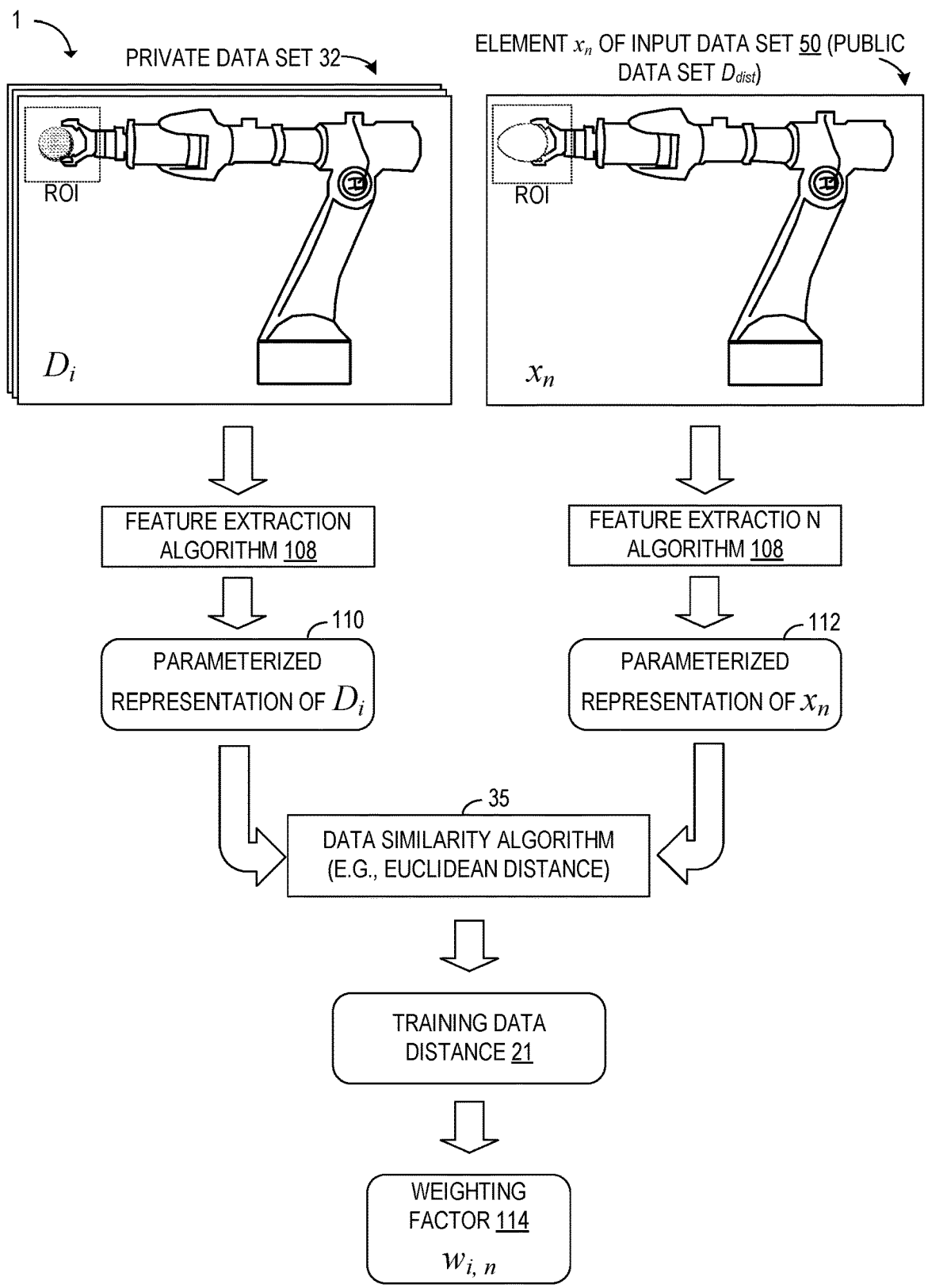
FIG. 6 is a schematic view that illustrates the computation of a weighting factor used in the weighted loss function of FIG. 5.

FIG. 6 illustrates a specific example of $x_n$, an image of an egg being grasped by a robot, in the input data set 50 (i.e., shared or public data set ($D_{dist}$)) being compared to the first private data set $D_i$. In this example, $D_i$ is a tagged collection of images of golf balls being grasped, or not grasped as the case may be, by a robot, the tag being a ground truth tag indicating whether the image shows the robot properly grasping the ball. A feature extraction algorithm 108 is applied to the element $x_n$ and private data set $D_i$ and produces parameterized representations 110, 112 of each. Typically, the features are scale invariant features, and they may be detected, for example, by a convolutional neural network. Alternatively, other types of features may be extracted. The parameterized representations 110, 112 may be, for example, multi-dimensional feature vectors. The feature vectors are fed to the first similarity algorithm 35, in this example, which computes a first training data distance 21, and then converts that into a weighting factor 114 for weighting the learning effect that element $x_n$ will have on the adaptive co-distillation model 60 (i.e., shared or public model $M_{server}$) which typically has a value between zero and one. As the training data distance 21 increases, the weighting factor 114 decreases, and as the training data 21 distance decreases, the weighting factor increases. Both values typically range between zero and one.

Figure 7:
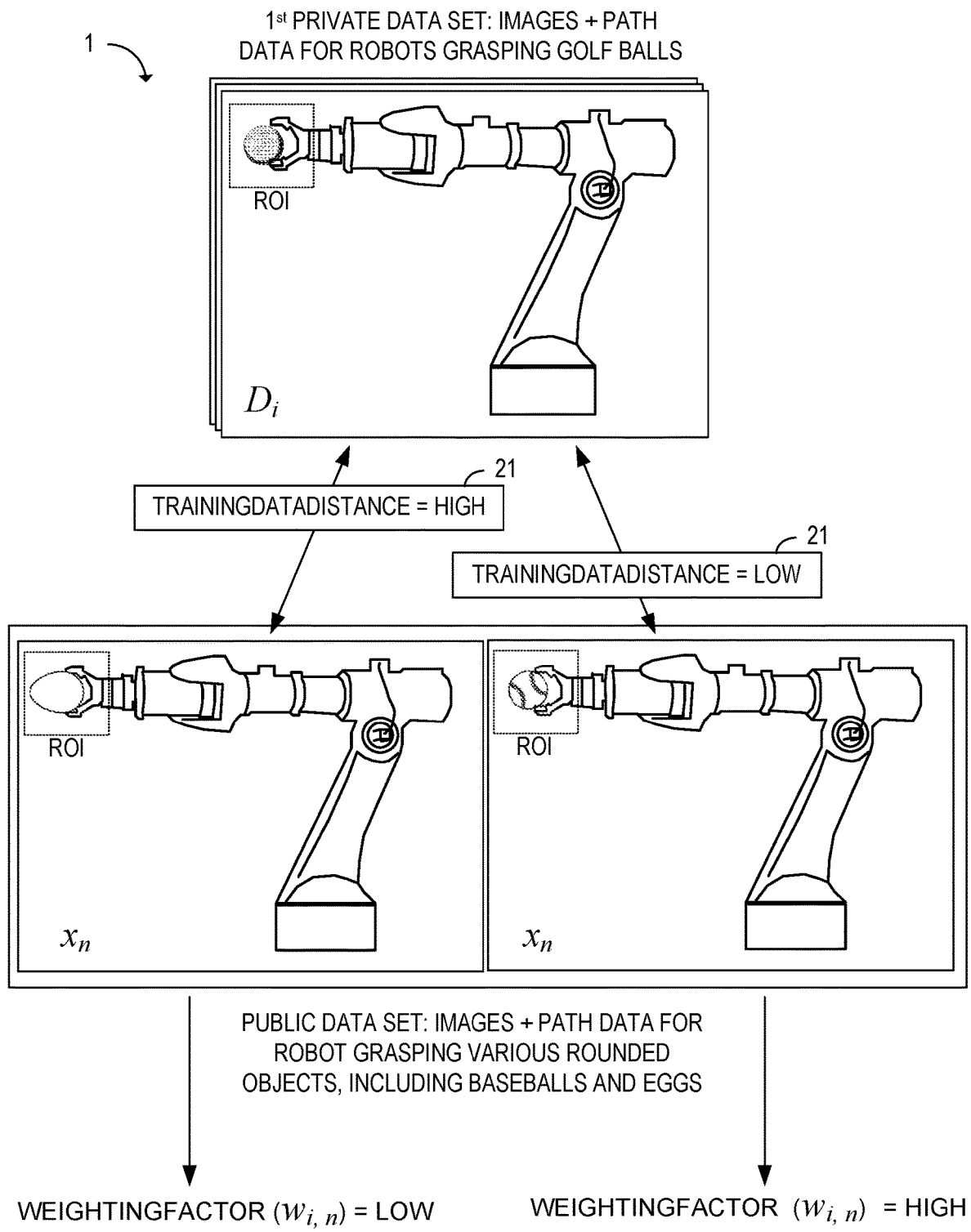
FIG. 7 illustrates the computation of training data distance between the private data set and each of two example images in the public data set.

FIG. 7 shows an example in which two images, one of a robot grasping an egg and the other of a robot grasping a baseball, are compared by the first similarity algorithm 35 to the private data set $D_i$, and shown to have a low and high training data distance 21, respectively. This difference may be attributed to the difference in shape of the egg to the golf balls in the private data set $D_i$, and the similarity in shape of the baseball to the golf balls in the region of interest (ROI) in the images in the private data set $D_i$. Accordingly, the similarity algorithm 35 computes respective weighting factors 114 that are low for the image with the egg and high for the image with the baseball. It will be understood that this is simply one illustrative example, as numerous variations are possible.

Figure 8:
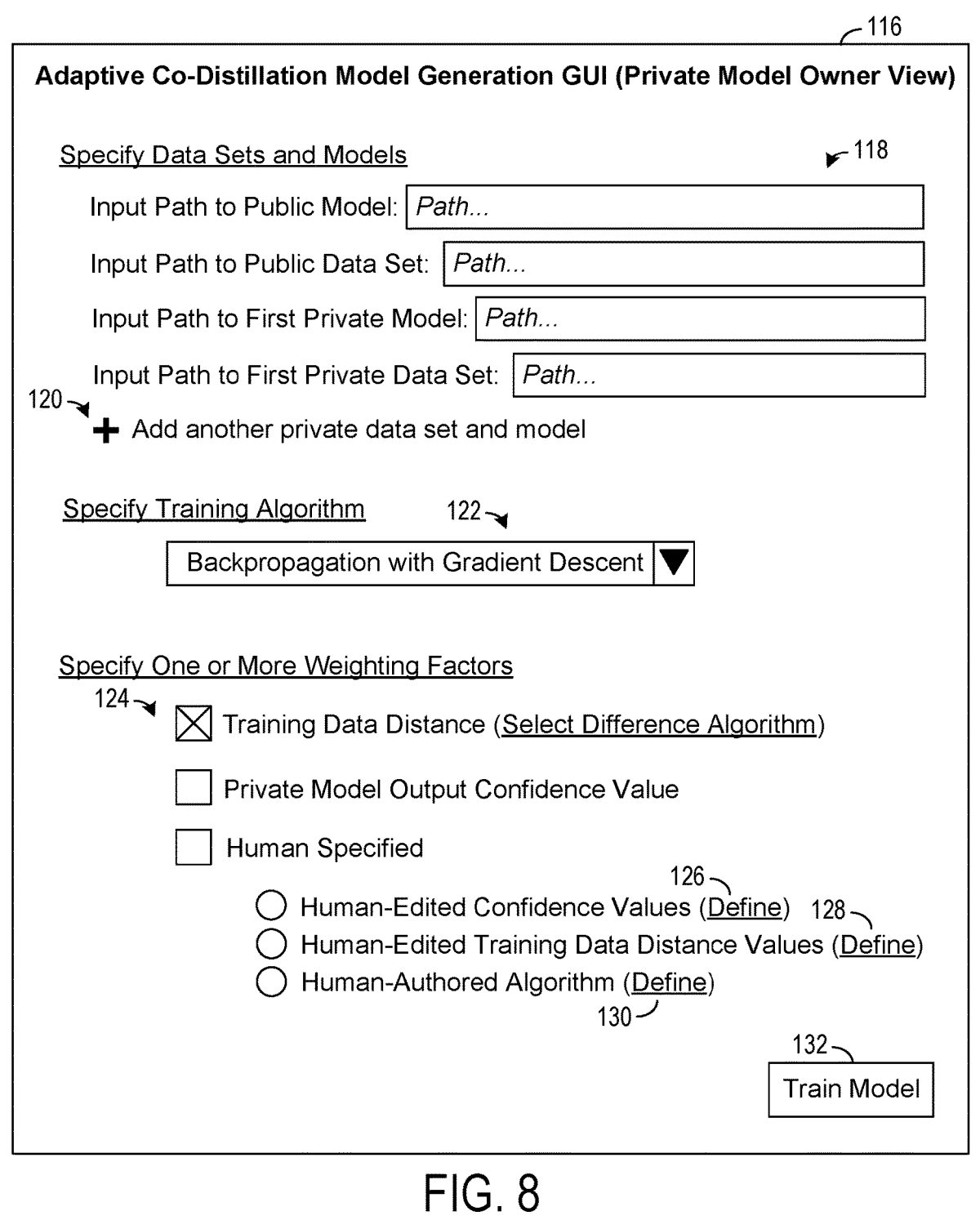

FIG. 8 illustrates a private model owner view of a graphical user interface GUI 116 for configuring the adaptive co-distillation model 60. As shown, the GUI 116 includes a plurality of input fields 118 for a user to specify paths to the public model, public data set, first private data set, and first private data model. An affordance 120 is provided to add additional private data sets and private models owned by the owner, as desired. It will be appreciated that other owners of different private data sets would train the public model on additional private models using a different view of the GUI 116. GUI 116 also includes a training algorithm selection tool 122, which as illustrated is set to select backpropagation with gradient descent as the training algorithm. GUI 116 also includes a selector 124 to specify one or more weighting factors 114 to be used by the first training algorithm 100. As shown, the weighting factor selector 124 includes a multiple selection checkbox tool, by which a user may select between one or more of training data distance, model output confidence value, or a human-specified factor such as human-edited confidence values, human-edited data distance values, or a human-authored algorithm. Links 126, 128, 130 to define these human specified values are displayed. Once the parameters are input, the user may select a train model command selector 132 to commence processing of the public data set (e.g., input data set 50) by the first private data model 30, to output the first results data set 20 that will be inputted into the adaptive co-distillation model 60, and as a result, the adaptive co-distillation model 60 is trained.

Figure 9:
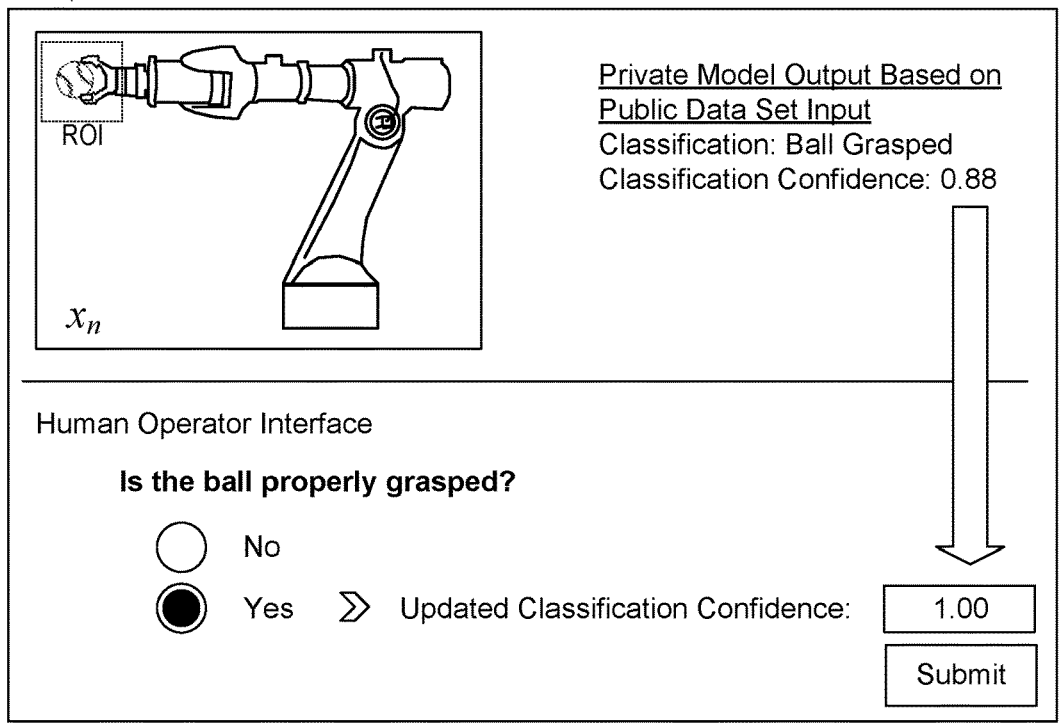
FIG. 9 illustrates an example interface for editing a classification confidence, according to the embodiment of FIG. 1.

FIG. 9 illustrates a human-edited confidence value user interface 134 that is displayed upon selection of link 126 in FIG. 9. As shown, the human-edited confidence value user interface 134 includes an element $x_n$ from input data set 50 as input to the first private model 30, and the output value (Ball Grasped classification) and the output confidence (0.88) of the first results data set 20. Via the human operator interface portion of the interface 134, a human operator may provide input to modify the first private model 30 output, for example, by selecting "Yes" to indicate that ball is properly grasped, and may input 1.00 as the classification confidence, as a human has determined this classification is correct as ground truth for training. This value may further be human edited by typing in a specific value. In the illustrated example, the private model computed a classification of Ball Grasped, with a 0.88 confidence value, which was human edited to 1.00 confidence via the interface.

Figure 10:
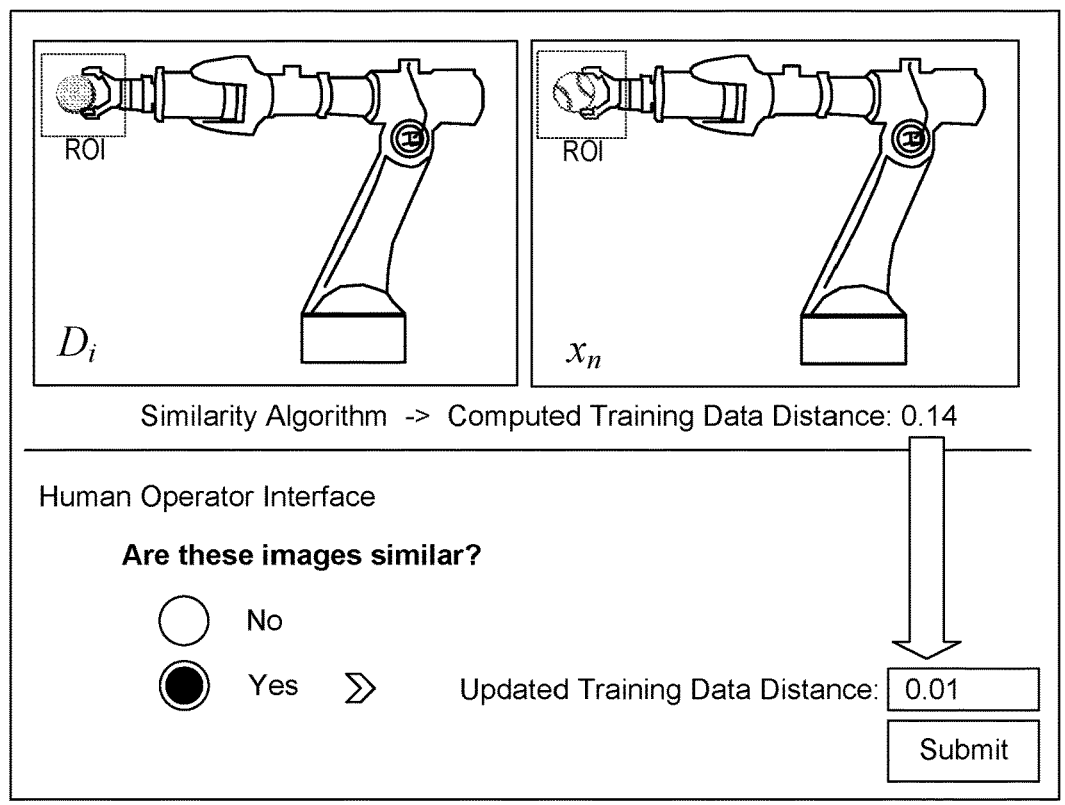
FIG. 10 illustrates an example interface for editing a training data distance, according to the embodiment of FIG. 1.

FIG. 10 illustrates a human-edited training data distance user interface 136 for providing human-edited training data distance values, which may be accessed by traversing the link 128 in FIG. 9. As shown, the user interface 134 displays an element $x_n$ from the input data set 50 and displays an element from the first private data set 32 ($D_i$). Typically, the interface 136 cycles through each of the elements in $D_i$ in order to receive human edited input comparing $x_n$ to each element in $D_i$. In response to each pair of images being displayed, the human operator may select "Yes" or "No" selectors to verify that the images are similar or dissimilar. Selecting "Yes" defaults in a training data distance of 0.01 and selecting "No" defaults in a training data distance of 1.0, both of which values may be further edited by the human operator as desired. Selecting "submit" cycles to the next image pair, until the training data distances for all images pairs have been human edited. In the illustrated example, the first similarity algorithm 35 computed a training data distance of 0.14 between the pair of images, which was human edited to 0.01.

Figure 11A:
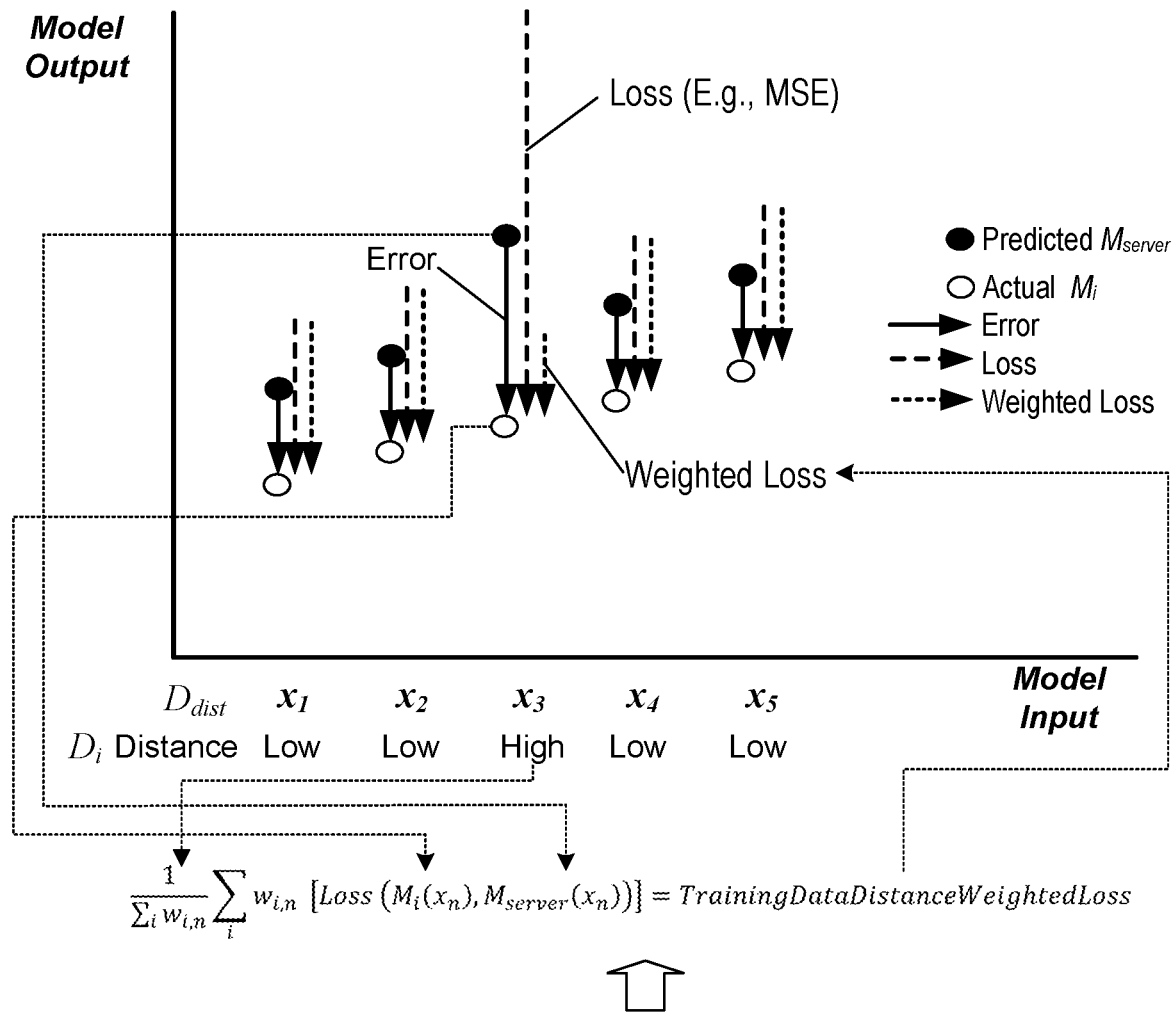
FIG. 11A is an example graph showing error, unweighted loss, and weighted loss between public and private model outputs for a series of given model inputs, according to the embodiment of FIG. 1.

FIG. 11A is an annotated graph that illustrates the relationship between model input, model output, error, unweighted loss, and weighted loss used to weight the output of the loss function used in training the public model. At the top of the figure is a graph of model input (each of $x_1$ through $x_5$ sample elements of the public data set 50) to model output for the adaptive co-distillation model (public model $M_{server}$) and the first private artificial intelligence model 30 (private model $M_i$). The difference between the two outputs is the error $E=M_{server}-M_i$. The error E is shown for ease of illustration in a single dimension, but more typically is multiple dimensional, like the output of the $M_{server}$ and $M_i$. Loss is typically computed according to a loss function based on the output values for $M_{server}$ and $M_i$. If a loss function is used that squares the error, such as Mean Squared Error, then the effect of large errors on loss are increased. In the graph, $x_1$, $x_2$, $x_4$, and $x_5$ are elements that have been determined by the first similarity algorithm 35 to be similar to the first private data set 32 ($D_i$), i.e., to have a low data distance to this first private data set 32 ($D_i$), using the process shown in FIG. 6, while $x_3$ has been determined to have a high data distance (i.e., low similarity) to first private data set 32 ($D_i$). For this reason the dot-dashed unweighted LOSS (E.g., MSE) vector is shown as larger than the solid error vector for $x_3$, while the dot-dashed unweighted LOSS vector is shown as approximately equivalent in length to the solid error vector for $x_1$, $x_2$, $x_4$, and $x_5$ Without weighting, the effect of the data element $x_3$ on the learning by the adaptive co-distillation model 60 (i.e., shared or public data model) would be larger than the effect of any one of data elements $x_1$, $x_2$, $x_4$, and $x_5$. And, since the training data distance of $x_3$ to $D_i$ is high, this larger learning effect would be unmerited and cause the adaptive co-distillation model 69 (i.e., shared or public data model) to produce erroneous results. To address this issue, a weighting factor is computed for $x_3$ that is relatively lower than for $x_1$, $x_2$, $x_4$, and $x_5$ according to the process described in FIG. 6, and is used to compute a weighted loss for the data element. The weighting factor $w_{i,n}$ is input into the formula reproduced in FIG. 11A below the graph, the first term of which is the weighted average of the weighting factor. This weighted average is multiplied by the output of the loss function (which may be any suitable loss function as described above), and the result is a weighted loss. Since the weighted loss in FIG. 11A is weighted by the training data distance, it is also referred to as a training data weighted loss. Note that the weighted loss for the data element $x_i$ with high data distance to $D_i$ is smaller than the weighted loss for the other data elements in the graph with lower data distances to $D_i$, as shown by the relative size difference in the dotted vectors representing weighted loss. It will be appreciated that the relative size of the unweighted and weighted loss vectors is for illustrative purposes, and the loss and error are illustrated on the same axis for illustrative purposes only.

Figure 11B:
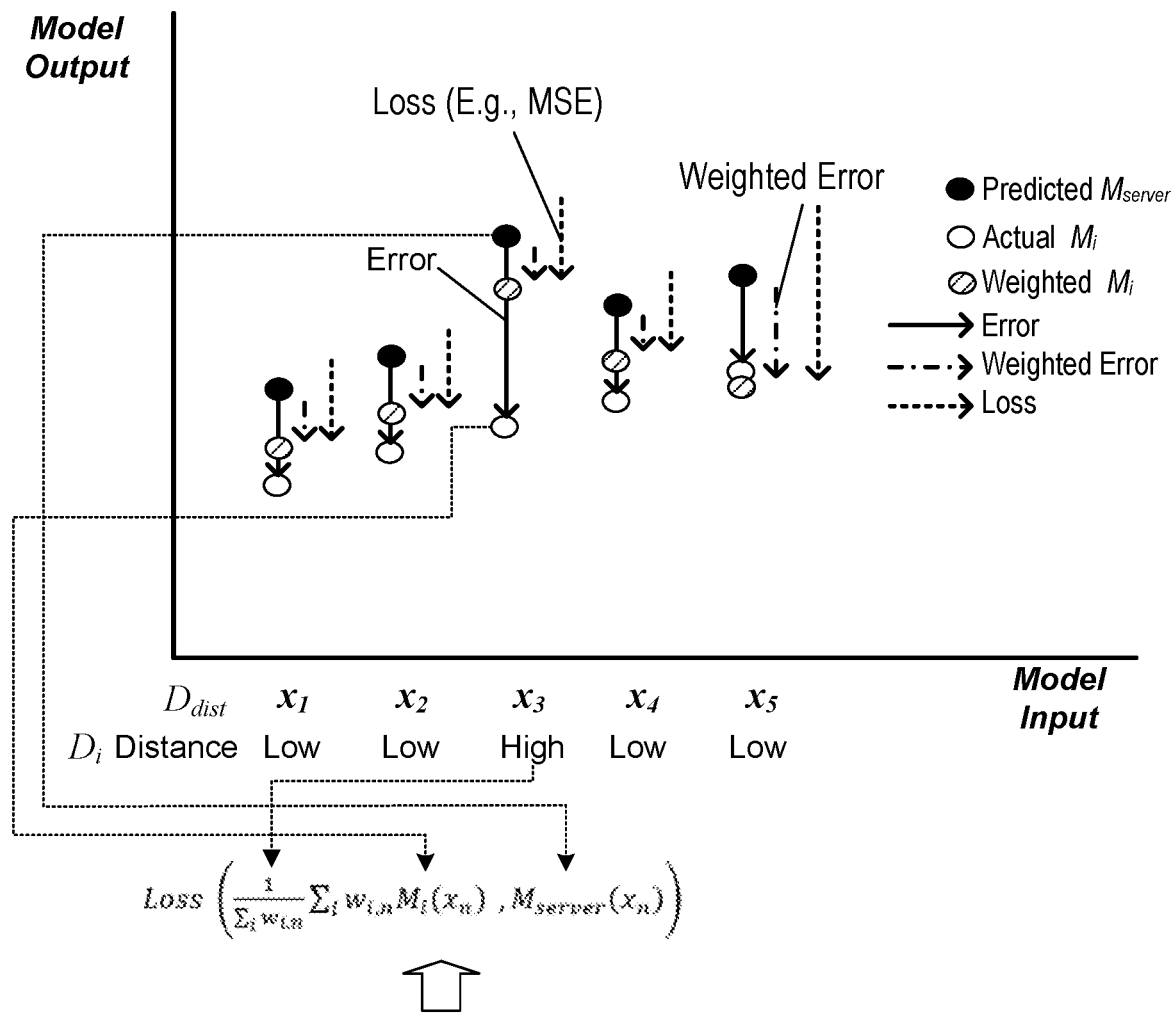
FIG. 11B is another example graph showing error between public and private model outputs and loss between public and weighted private model outputs for a series of given model inputs, according to the embodiment of FIG. 1.

It will be appreciated that as an alternative to computing a weighted loss according to the expression given above, alternative forms of weighting may be used to minimize the learning effect of data elements in the public data set that have a high data distance to a private data set. For example, an input weighted loss function may be used. FIG. 11B shows an annotated graph similar to FIG. 11A when the following expression of an input weighted loss function is instead used:

$$\text{Loss}\left(\frac{1}{\sum_i w_{i,n}} \sum_i w_{i,n} M_i(x_n), M_{server}(x_n)\right)$$

In this expression, a weighted average is applied to the private model output values $M_i$ for each model input $x_i$ rather than to the outputs of the loss function. In addition to the actual $M_i$ values, FIG. 11B further shows weighted $M_i$ values that are used as inputs for the loss function. As in the example of FIG. 11A, the loss function in this example may be Mean Squared Error or any other suitable loss function. By weighting the private model output values $M_i$ before outputting them into the loss function, the processor 12 may reduce the amount of noise in the private model output values $M_i$ that propagates to the computed values of the loss function, and thus learn less from the data elements in the public data set that have a high data distance from the private data set than is learned from data elements that have a low data distance from the private data set.

Figure 12:
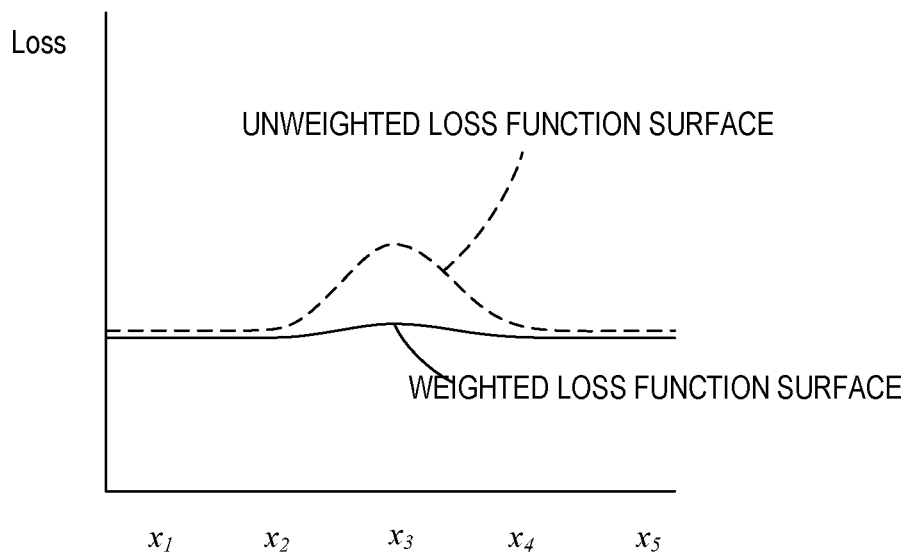
FIG. 12 is a graph showing weighted and unweighted loss surfaces, in one dimension, according to the embodiment of FIG. 1.

FIG. 12 illustrates an example two-dimensional loss function surface as curve. This two-dimensional representation is for ease of illustration as more typically the loss function is multi-dimensional. Loss is shown graphed for each of $x_1$ through $x_5$, the same data elements illustrated in FIG. 11A. The unweighted loss surface is shown as a dashed line, with a peak at $x_3$, due to the large unweighted loss for that data element shown in FIG. 11A. The weighted loss surface is shown in solid lines and does not have a peak at $x_3$. By weighting the loss surface, the inappropriate learning effect from high unweighted loss in the vicinity of $x_3$ can be avoided. In this way, the adaptive co-distillation model can learn from data in the input data set 50, without learning too much from data in the input data set that is dissimilar to the data in the private data sets.

Figure 13:
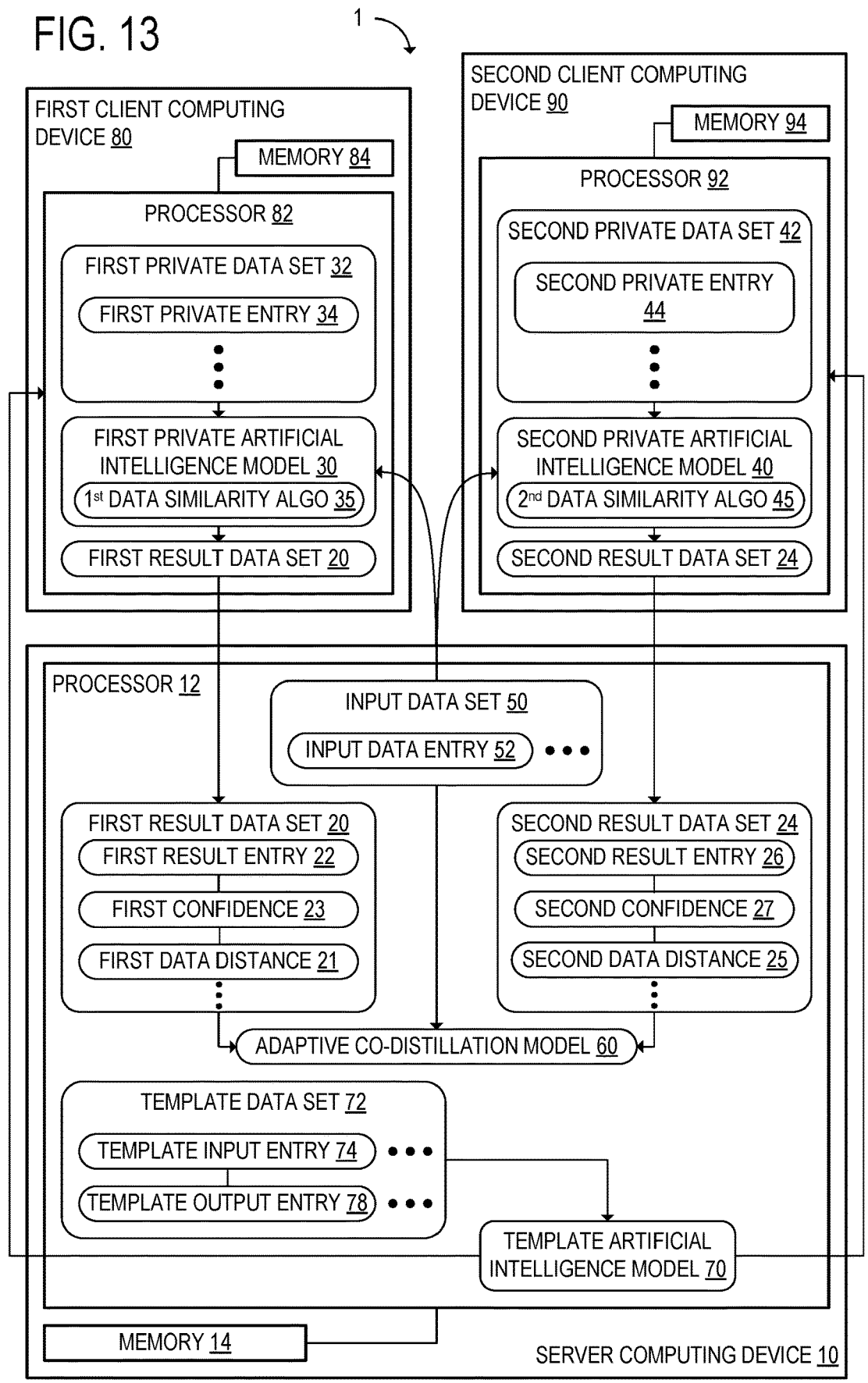
FIG. 13 shows the example computing system of FIG. 1 when a template machine learning model is trained at the server computing device.

FIG. 13 shows the computing system 1 of FIG. 1 when a template machine learning model 70 is trained at the processor 12 of the server computing device 10. As shown in the example of FIG. 13, the processor 12 may be further configured to train a template machine learning model 70 on a template data set 72 prior to the training of the first private artificial intelligence model 30 and the second private artificial intelligence model 40 with the first private data set 32 and the second private data set 42 at the first client computing device 80 and the second client computing device 90. The template data set 72 may include a plurality of template input entries 74 that are associated with a respective plurality of template output entries 78. Each of the template input entries 74 may have the same data type as that of the input data entries 52 included in the input data set 50. In addition, the template output entries 78 may each have the data type of the adaptive co-distillation model outputs 68 that the adaptive co-distillation model 60 is subsequently trained to produce.

Figure 14:
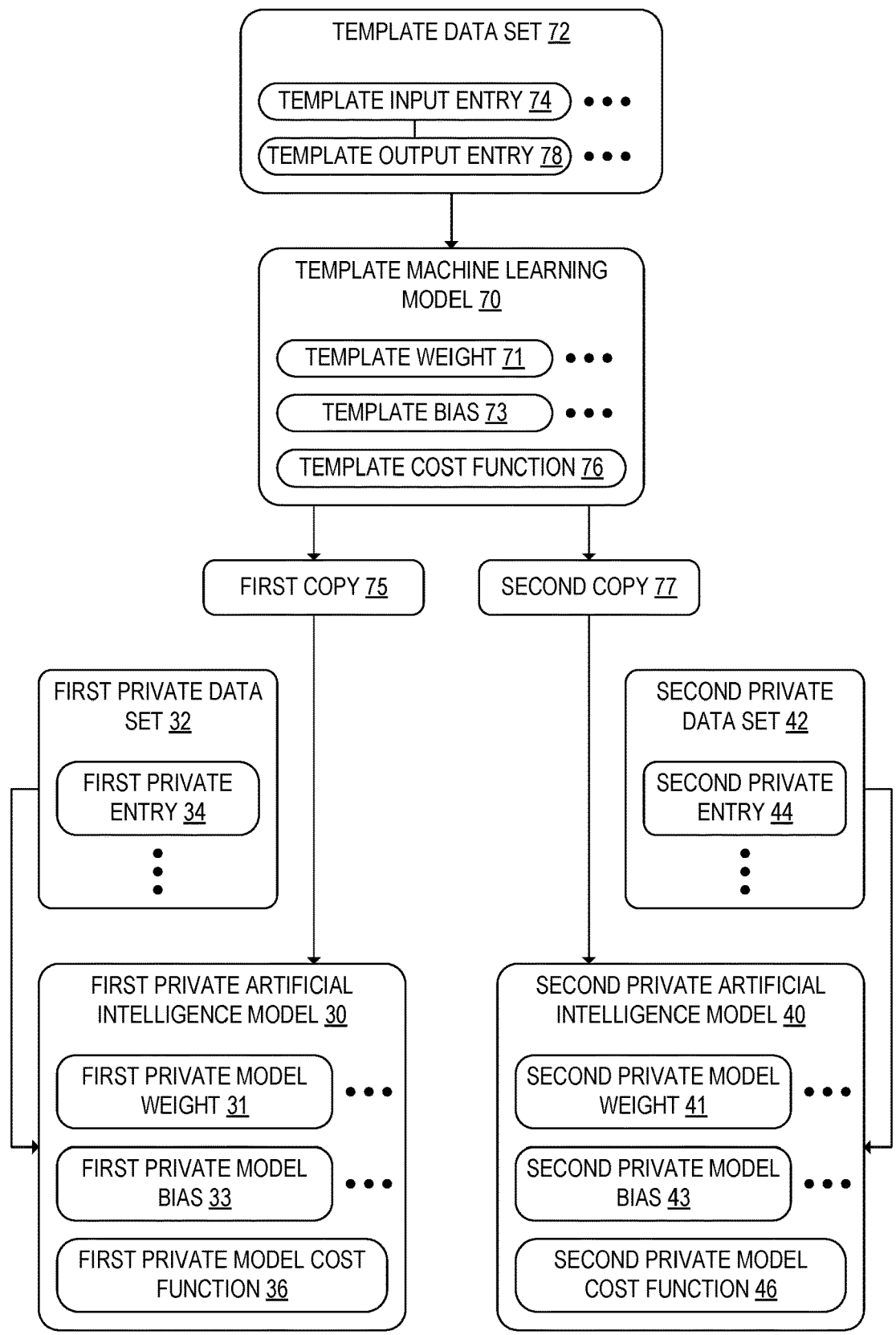
FIG. 14 shows the training of the template machine learning model in an example in which the template machine learning model is a deep neural network, according to the embodiment of FIG. 1.

FIG. 14 shows the template machine learning model 70 in additional detail in an embodiment in which the template machine learning model 70 is a deep neural network. In the example of FIG. 14, the template machine learning model has a plurality of template weights 71 for the connections between its neurons. In addition, the template machine learning model 70 has a respective template bias 73 for each neuron. The template machine learning model 70 may be trained via backpropagation with stochastic gradient descent, which may use a template cost function 76. The template cost function 76 may, for example, be a mean squared error cost function. Alternatively, other training methods and other cost functions may be used, as discussed above.

After the template machine learning model 70 has been trained the processor 12 of the server computing device 10 may be further configured to transmit copies of the template machine learning model 70 to the first client computing device 80 and the second client computing device 90. In the example of FIG. 14, a first copy 75 and a second copy 77 of the template machine learning model 70 are transmitted to the first client computing device 80 and the second client computing device 90 respectively. The first private artificial intelligence model 30 in the example of FIG. 14 is the first copy 75 of the template machine learning model 70 after it has been further trained on the first private data set 32. Similarly, the second private artificial intelligence model 40 is the second copy 77 of the template machine learning model 70 after it has been further trained on the second private data set 42. Thus, the template machine learning model 70 may be used as a template for the first private artificial intelligence model 30 and the second private artificial intelligence model 40 that is initially trained on the template data set 72 and further trained at the first client computing device 80 and the second client computing device 90. It will be appreciated that according to the embodiment of FIGS. 13 and 14, after the first and second private machine learning models 30, 40 that have been trained both based on the template machine learning model 70 and the private data sets 32, 42 are fed the unlabeled or partially labelled input data set 50, they produce first and second results data sets 20, 24 that are in turn used to train the adaptive co-distillation model 60 in the same manner described previously in regards to the embodiment of FIG. 1.

Figure 15A:
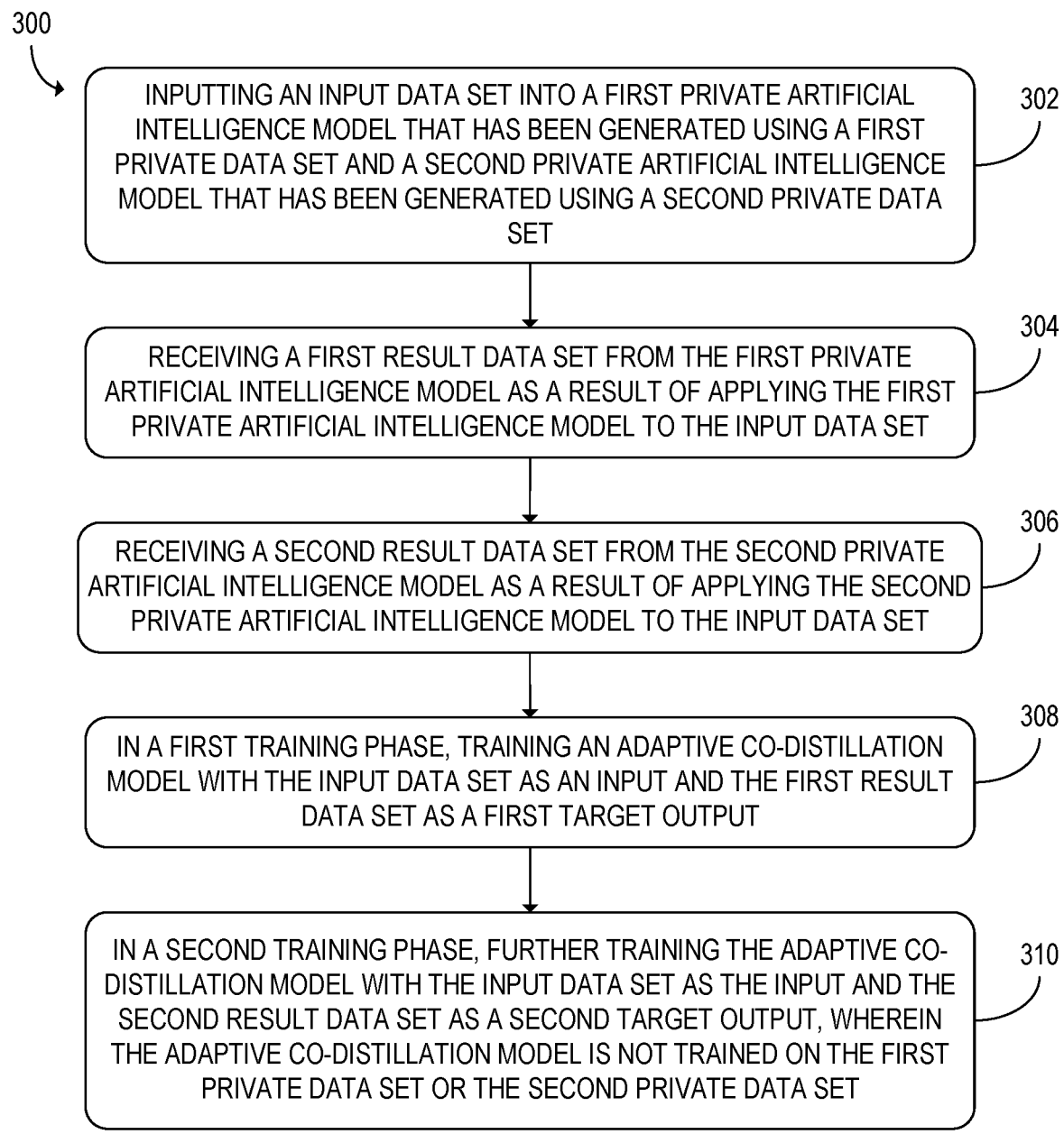
FIG. 15A shows a flowchart of an example method of training an adaptive co-distillation model, according to the embodiment of FIG. 1.

FIG. 15A shows a flowchart of an example method 300 that may be used with a computing system. The method 300 of FIG. 15A may be used with the example computing system 1 of FIG. 1 or with some other computing system. At step 302, the method 300 may include inputting an input data set into a first private artificial intelligence model that has been generated using a first private data set and a second private artificial intelligence model that has been generated using a second private data set. The input data set may include a plurality of input data entries. In some embodiments, the first private artificial intelligence model and the second private artificial intelligence model may be executed at a corresponding first client computing device and second client computing device. In such embodiments, the input data set may be transmitted to the first client computing device and the second client computing device from a server computing device. The first private data set may include a plurality of first private entries, which may be example inputs and corresponding example outputs with which the first private artificial intelligence model is trained. Similarly, the second private data set may include a plurality of second private entries, which may be example inputs and corresponding example outputs with which the second private artificial intelligence model is trained.

At step 304, the method 300 may further include receiving a first result data set from the first private artificial intelligence model as a result of applying the first private artificial intelligence model to the input data set. The first result data set may include a plurality of first result entries. The first result data set may further include one or more first confidence values associated with each first result entry. In addition, at step 306, the method 300 may further include receiving a second result data set from the second private artificial intelligence model as a result of applying the second private artificial intelligence model to the input data set. The second result data set may include a plurality of second result entries. In some embodiments, the second result data set may include one or more second confidence values associated with each second result entry.

In some embodiments, the first private artificial intelligence model may have a first model architecture, and the second private artificial intelligence model may have a second model architecture that is different from the first model architecture. For example, each of the first private artificial intelligence model and the second private artificial intelligence model may be a deep neural network, a kernel machine, or a random forest. The type of machine learning algorithm used for the first private artificial intelligence model may differ from the type of machine learning algorithm used for the second private artificial intelligence model. Alternatively, if the same type of machine learning model is used for both the first private artificial intelligence model and the second private artificial intelligence model, parameters such as number of neurons or number of layers may differ between the two models.

At step 308, the method 300 may further include, in a first training phase, training an adaptive co-distillation model with the input data set as an input and the first result data set as a first target output. Thus, the adaptive co-distillation model may be trained to produce the same result data produced by the first private artificial intelligence model when given the input data set as input. The adaptive co-distillation model may, for example, be trained using backpropagation with stochastic gradient descent. When backpropagation is used to train the adaptive co-distillation model, the adaptive co-distillation model may have an adaptive co-distillation model cost function.

At step 310, the method 300 may further include, in a second training phase, further training the adaptive co-distillation model with the input data set as the input and the second result data set as a second target output. The second training phase may be performed subsequently to the first training phase. Similarly to the training of the adaptive co-distillation model in the first training phase, the training of the adaptive co-distillation model in the second phase may be performed via backpropagation. In the steps of the method 300 in which the adaptive co-distillation model is trained, the adaptive co-distillation model is not trained on the first private data set or the second private data set. Thus, the first private data set and the second private data set may be kept private from the server computing device. In addition, since the adaptive co-distillation model may be trained using the result data sets produced by the first private artificial intelligence model and the second private artificial intelligence model without explicit reference to the model architectures of the first private artificial intelligence model and the second private artificial intelligence model, the structures of the first private artificial intelligence model and the second private artificial intelligence model may also be kept private.

In method 300, it will be appreciated that in at least the first training phase at 308, and also typically the second training phase at 310, the adaptive co-distillation model is trained using a training algorithm that utilizes a weighted loss function, as described above. The weighted loss function weights loss between a predicted output of the adaptive co-distillation model and the target data output of the first results data set and second results data set by a weighting factor that is based on one or more of (a) a data distance between an element in the first (or second) input data set and the first (or second) private data set as determined by a first (or second) similarity algorithm, (b) a confidence value in the first result data set output by the first or second private artificial intelligence model, and a human-specified input, as illustrated above in FIG. 8.

Figure 15B:
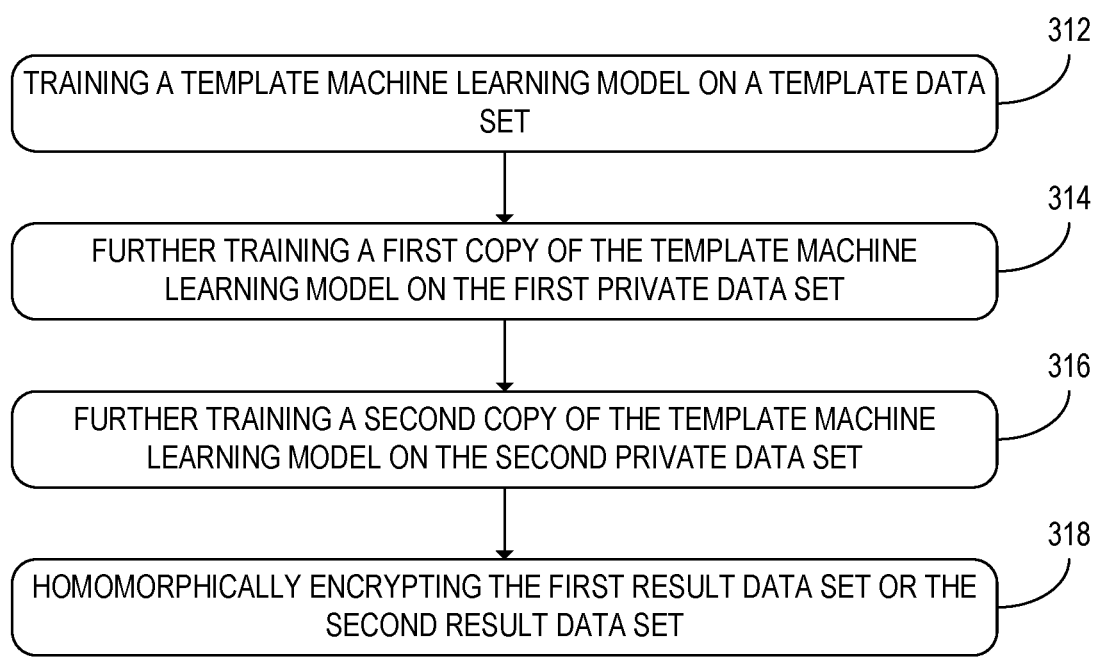
FIG. 15B shows additional steps that may be performed in some embodiments when performing the method of FIG. 15A.

FIG. 15B shows additional steps that may be performed in some embodiments when performing the method 300 of FIG. 15A. At step 312, the method 300 may further include training a template machine learning model on a template data set. The template data set may include a plurality of template input entries and a plurality of template output entries. The template machine learning model may, for example, be a deep neural network, a kernel machine, or a random forest. The template machine learning model may be trained at the server computing device in some embodiments. At step 314, the method may further include training a first copy of the template machine learning model on the first private data set. Similarly, at step 316, the method 300 may further include training a second copy of the template machine learning model on the second private data set. Step 314 and step 316 may be performed at the first client computing device and the second client computing device, to which the processor of the server computing device may be configured to transmit the copies of the template machine learning model. Thus, the first private data set and the second private data set may be used to further train copies a template machine learning model at the client computing devices.

At step 318, the method 300 may further include homomorphically encrypting the first result data set or the second result data set. The encryption algorithm used to homomorphically encrypt the first result data set or the second result data set may be a partially homomorphic, somewhat homomorphic, leveled fully homomorphic, or fully homomorphic encryption algorithm. The first result data set or the second result data set may be homomorphically encrypted at the first client computing device or the second client computing device respectively prior to transmitting the first result data set or the second result data set to the server computing device. Thus, the plaintext versions of the first result entries and the second result entries may be kept private.

Although the example computing systems and methods described above are described with reference to a first client computing device 80 and a second client computing device 90, the above systems and methods may be used with more than two client computing devices. Each client computing device may have a respective private data set that is used to train a private artificial intelligence model. In addition, each client computing device may transmit a respective result data set to the server computing device 10. The processor 12 of the server computing device 10 may sequentially train the adaptive co-distillation model 60 on the respective result data sets received from each of the plurality of client computing devices. In some embodiments, the processor 12 may train the adaptive co-distillation model 60 using one or more batches including two or more result data sets with which the adaptive co-distillation model 60 is trained concurrently.

In one example use case scenario, the users of the first client computing device and the second client computing device are industrial manufacturers that manufacture electronic devices such as inspection machines. In this example, the first client computing device executes a support-vector machine to distinguish between resistors and capacitors in images when sorting circuit components. The second client computing device executes a convolutional neural network to distinguish between intact and damaged electronic components. The adaptive co-distillation model is trained using the outputs of both the support-vector machine and the convolutional neural network. At runtime, the adaptive co-distillation model both distinguishes between intact resistors, intact capacitors, damaged resistors, and damaged capacitors. Neither the support vector machine nor the convolutional neural network of this example is shared between the industrial manufacturers, and the data used to train each is kept private to each industrial manufacturer as well.

In this example, as an alternative to a convolutional neural network, a heuristic model may be used to distinguish between intact and damaged electronic components. For example, the heuristic model may be an edge detector configured to determine whether an electronic component (a resistor or a capacitor) has a cracked outer surface. In this example, the second private data set may be used as a test data set rather than a training data set. Although the heuristic edge detector is not a machine learning model, the outputs of the heuristic edge detector may used along with the outputs of the support vector machine to train the adaptive co-distillation model.

In another example use case scenario, the first private artificial intelligence model is a recurrent neural network configured to generate a text transcription of speech. The second private artificial intelligence model is another recurrent neural network configured to distinguish between the speech of multiple people whose speech is included in an audio input. Using the outputs produced by the two recurrent neural networks when given a shared set of audio inputs, the adaptive co-distillation model may be trained to generate text transcriptions of speech included in an audio input and to tag each utterance in the transcription with an indication of which person spoke it. This is achieved without sharing of the individual recurrent neural networks themselves or the data used to train each recurrent neural network.

In another example use case scenario, the first private artificial intelligence model is a recurrent neural network configured to control the motion of a robotic arm to pass manufactured items from one area in a factory to another area. The second private artificial intelligence model is another recurrent neural network configured to the movement of an autonomous robot as the robot navigates a physical environment. The shared input data set given to the first private artificial intelligence model and the second private artificial intelligence model includes layout data indicating the sizes, shapes, and positions of objects in a factory environment. Using the respective outputs of the first private artificial intelligence model and the second private artificial intelligence model, the adaptive co-distillation model is trained to output combined movement paths by which the manufactured items are moved from one area of the factory environment to another area of the factory environment. In each combined movement path, a manufactured item is moved from an initial location to the autonomous robot by the robotic arm and is then moved to a final location by the autonomous robot. The adaptive co-distillation model is trained to generate the combined movement paths without the manufacturer of the robotic arm and the manufacturer of the autonomous robot having to give the user who trains the adaptive co-distillation model access to their private machine learning models.

In other example use case scenario, an adaptive co-distillation model is trained for use in a medical setting. In this example, the first private artificial intelligence model is a support vector machine configured to identify which bones are present in an x-ray image. The second private artificial intelligence model is a convolutional neural network configured to determine whether a bone in an x-ray image is fractured. An input data set including a plurality of x-ray images is input into both the first private artificial intelligence model and the second private artificial intelligence model, and the outputs of the private models are used to train the adaptive co-distillation model. The trained adaptive co-distillation model is configured to receive x-ray images and output respective labels that indicate which bones, if any, that appear in the x-ray image are fractured.

In other example use case scenario, an adaptive co-distillation model is trained to perform traffic flow analysis. In this example, the first private artificial intelligence model is a recurrent neural network configured to estimate a flow rate of a group of people moving through a space (e.g. a train station) depicted in a live camera feed or stored video. The first private artificial intelligence model is a regression model configured to output a numerical value. The second private artificial intelligence model is another regression model configured to estimate a density of people within a space shown in a video. The first private artificial intelligence model and the second private artificial intelligence model both receive an input data set including a plurality of videos of crowds of people moving through a respective plurality of physical environments. Based on the outputs of the first private artificial intelligence model and the second private artificial intelligence model, an adaptive co-distillation model is trained to estimate a level of traffic congestion (defined as a function of the flow rate and the density) of a plurality of people moving through an physical area. The adaptive co-distillation model is a regression model that is configured to receive video footage as an input and output a numerical estimate of a traffic congestion level.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
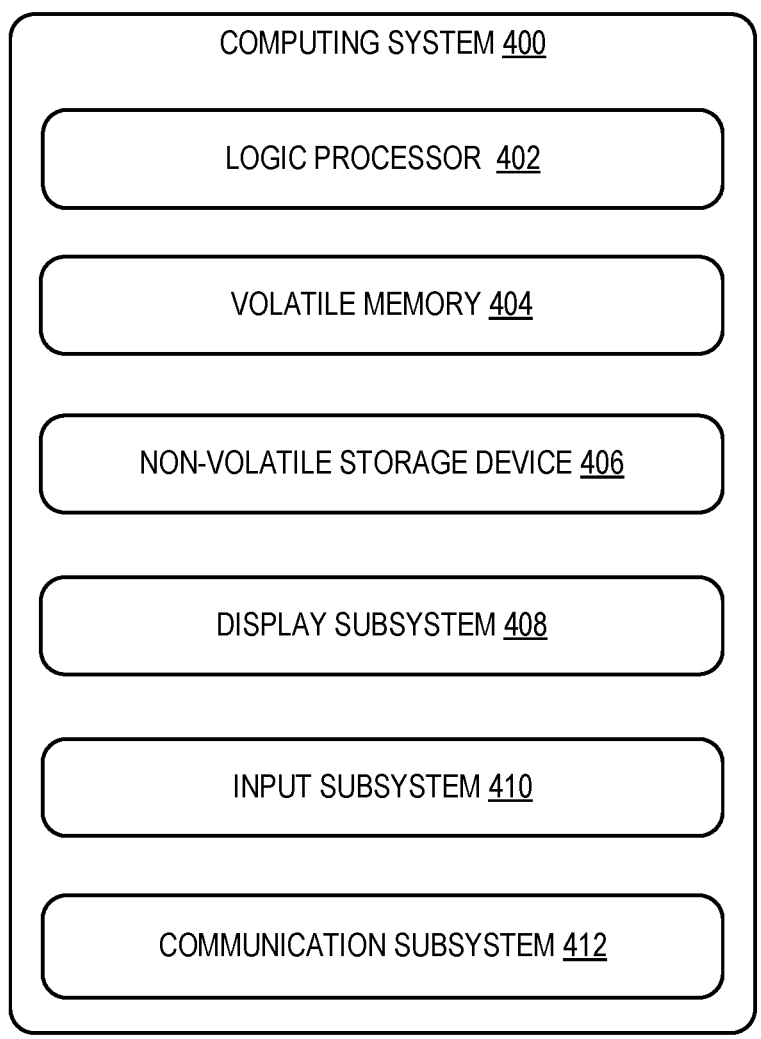
FIG. 16 shows a schematic view of an example computing environment in which the computing system of FIG. 1 may be enacted.

FIG. 16 schematically shows a non-limiting embodiment of a computing system 400 that can enact one or more of the methods and processes described above. Computing system 400 is shown in simplified form. Computing system 400 may embody the computing system 1 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 16.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a method for use with a computing device is provided. The method may include inputting an input data set into a first private artificial intelligence model that has been generated using a first private data set and a second private artificial intelligence model that has been generated using a second private data set. The method may further include receiving a first result data set from the first private artificial intelligence model as a result of applying the first private artificial intelligence model to the input data set. The method may further include receiving a second result data set from the second private artificial intelligence model as a result of applying the second private artificial intelligence model to the input data set. In a first training phase, the method may further include training an adaptive co-distillation model with the input data set as an input and the first result data set as a first target output. In a second training phase, the method may further include further training the adaptive co-distillation model with the input data set as the input and the second result data set as a second target output. The adaptive co-distillation model may not be trained on the first private data set or the second private data set.

According to this aspect, the first private artificial intelligence model may have a first model architecture and the second private artificial intelligence model may have a second model architecture that is different from the first model architecture.

According to this aspect, each of the first private artificial intelligence model and the second private artificial intelligence model is a deep neural network, a kernel machine, or a random forest.

According to this aspect, the adaptive co-distillation model may be a classification model. The first result data set and the second result data set may each include a respective plurality of classification labels.

According to this aspect, the input data set may be a partially labeled data set including a first subset of input data entries that have respective input classification labels and a second subset of input data entries that do not have respective input classification labels.

According to this aspect, the adaptive co-distillation model is a regression model. The first result data set and the second result data set may each include a respective plurality of numerical values.

According to this aspect, the adaptive co-distillation model may be a recurrent neural network. The input data set may include a plurality of input series that each include a plurality of ordered input values.

According to this aspect, in at least the first training phase, the adaptive co-distillation model may be trained using a training algorithm that utilizes a weighted loss function.

According to this aspect, the weighted loss function may weight loss between a predicted output of the adaptive co-distillation model and the target data output of the first results data set by a weighting factor that is based on one or more of a data distance between an element in the input data set and the first private data set as determined by a first similarity algorithm, a confidence value in the first result data set, and a human-specified input.

According to this aspect, the first result data set or the second result data set may be homomorphically encrypted.

According to this aspect, the adaptive co-distillation model may be trained at least in part via supervised learning.

According to another aspect of the present disclosure, a computing system is provided, including a server computing device including a processor. The processor may be configured to transmit an input data set to a first client computing device configured to execute a first private artificial intelligence model that has been generated using a first private data set. The processor may be further configured to transmit the input data set to a second client computing device configured to execute a second private artificial intelligence model that has been generated using a second private data set. The processor may be further configured to receive a first result data set from the first private artificial intelligence model executed at the first client computing device as a result of applying the first private artificial intelligence model to the input data set. The processor may be further configured to receive a second result data set from the second private artificial intelligence model executed at the second client computing device as a result of applying the second private artificial intelligence model to the input data set. In a first training phase, the processor may be further configured to train an adaptive co-distillation model with the input data set as an input and the first result data set as a first target output. In a second training phase, the processor may be further configured to further train the adaptive co-distillation model with the input data set as the input and the second result data set as a second target output. The adaptive co-distillation model may not be trained on the first private data set or the second private data set.

According to this aspect, the first private artificial intelligence model may have a first model architecture and the second private artificial intelligence model may have a second model architecture that is different from the first model architecture.

According to this aspect, each of the first private artificial intelligence model and the second private artificial intelligence model may be a deep neural network, a kernel machine, or a random forest.

According to this aspect, the adaptive co-distillation model may be a classification model. The first result data set and the second result data set may each include a respective plurality of classification labels.

According to this aspect, the adaptive co-distillation model may be a regression model. The first result data set and the second result data set may each include a respective plurality of numerical values.

According to this aspect, the adaptive co-distillation model may be a recurrent neural network. The input data set may include a plurality of input series that each include a plurality of ordered input values.

According to this aspect, the processor may be further configured to train a template machine learning model on a template data set. The processor may be further configured to transmit the template machine learning model to the first client computing device and the second client computing device. The first private artificial intelligence model may be a first copy of the template machine learning model that has been further trained on the first private data set. The second private artificial intelligence model may be a second copy of the template machine learning model that has been further trained on the second private data set.

According to this aspect, the adaptive co-distillation model may be trained at least in part via supervised learning.

According to another aspect of the present disclosure, a method for use with a computing device is provided. The method may include inputting an input data set into a first private artificial intelligence model that has been generated using a first private data set and a second private artificial intelligence model that has been generated using a second private data set. The method may further include receiving a first result data set from the first private artificial intelligence model as a result of applying the first private artificial intelligence model to the input data set. The first result data set may include a plurality of first classification labels. The method may further include receiving a second result data set from the second private artificial intelligence model as a result of applying the second private artificial intelligence model to the input data set. The second result data set may include a plurality of second classification labels. In a first training phase, the method may further include training an adaptive co-distillation model with the input data set as an input and the first result data set as a first target output. In a second training phase, the method may further include further training the adaptive co-distillation model with the input data set as the input and the second result data set as a second target output. The adaptive co-distillation model may not be trained on the first private data set or the second private data set. The method may further include receiving a runtime data set including a plurality of runtime input data entries. For each of the plurality of runtime input data entries, the method may further include outputting a runtime classification label selected from a combined classification label set including the plurality of first classification labels and the plurality of second classification labels.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for use with a computing device, the method comprising:
inputting an input data set into a first private artificial intelligence model that has been generated using a first private data set and a second private artificial intelligence model that has been generated using a second private data set;
receiving a first result data set from the first private artificial intelligence model as a result of applying the first private artificial intelligence model to the input data set;
receiving a second result data set from the second private artificial intelligence model as a result of applying the second private artificial intelligence model to the input data set;
in a first training phase, training an adaptive co-distillation model with the input data set as an input and the first result data set as a first target output, wherein:
in at least the first training phase, the adaptive co-distillation model is trained using a training algorithm that utilizes a weighted loss function; and
the weighted loss function weights loss between a predicted output of the adaptive co-distillation model and the first result data set by a weighting factor that is based on one or more of:
a data distance between an element in the input data set and the first private data set as determined by a first similarity algorithm;
a confidence value in the first result data set; and
a human-specified input; and
in a second training phase, further training the adaptive co-distillation model with the input data set as the input and the second result data set as a second target output, wherein the adaptive co-distillation model is not trained on the first private data set or the second private data set.

2. The method of claim 1, wherein the first private artificial intelligence model has a first model architecture and the second private artificial intelligence model has a second model architecture that is different from the first model architecture.

3. The method of claim 2, wherein each of the first private artificial intelligence model and the second private artificial intelligence model is a deep neural network, a kernel machine, or a random forest.

4. The method of claim 1, wherein:
   the adaptive co-distillation model is a classification model; and
   the first result data set and the second result data set each include a respective plurality of classification labels.

5. The method of claim 4, wherein the input data set is a partially labeled data set including a first subset of input data entries that have respective input classification labels and a second subset of input data entries that do not have respective input classification labels.

6. The method of claim 1, wherein:
   the adaptive co-distillation model is a regression model; and
   the first result data set and the second result data set each include a respective plurality of numerical values.

7. The method of claim 1, wherein:
   the adaptive co-distillation model is a recurrent neural network; and
   the input data set includes a plurality of input series that each include a plurality of ordered input values.

8. The method of claim 1, wherein the first result data set or the second result data set is homomorphically encrypted.

9. The method of claim 1, wherein the adaptive co-distillation model is trained at least in part via supervised learning.

10. A computing system comprising:
    a server computing device including a processor configured to:
    transmit an input data set to:
      a first client computing device configured to execute a first private artificial intelligence model that has been generated using a first private data set; and
      a second client computing device configured to execute a second private artificial intelligence model that has been generated using a second private data set;
    receive a first result data set from the first private artificial intelligence model executed at the first client computing device as a result of applying the first private artificial intelligence model to the input data set;
    receive a second result data set from the second private artificial intelligence model executed at the second client computing device as a result of applying the second private artificial intelligence model to the input data set;
    in a first training phase, train an adaptive co-distillation model with the input data set as an input and the first result data set as a first target output, wherein:
      in at least the first training phase, the adaptive co-distillation model is trained using a training algorithm that utilizes a weighted loss function; and
      the weighted loss function weights loss between a predicted output of the adaptive co-distillation model and the first result data set by a weighting factor that is based on one or more of:
        a data distance between an element in the input data set and the first private data set as determined by a first similarity algorithm;
        a confidence value in the first result data set; and
        a human-specified input; and
    in a second training phase, further train the adaptive co-distillation model with the input data set as the input and the second result data set as a second target output,
    wherein the adaptive co-distillation model is not trained on the first private data set or the second private data set.

11. The computing system of claim 10, wherein the first private artificial intelligence model has a first model architecture and the second private artificial intelligence model has a second model architecture that is different from the first model architecture.

12. The computing system of claim 11, wherein each of the first private artificial intelligence model and the second private artificial intelligence model is a deep neural network, a kernel machine, or a random forest.

13. The computing system of claim 10, wherein:
    the adaptive co-distillation model is a classification model; and
    the first result data set and the second result data set each include a respective plurality of classification labels.

14. The computing system of claim 10, wherein:
    the adaptive co-distillation model is a regression model; and
    the first result data set and the second result data set each include a respective plurality of numerical values.

15. The computing system of claim 10, wherein:
    the adaptive co-distillation model is a recurrent neural network; and
    the input data set includes a plurality of input series that each include a plurality of ordered input values.

16. The computing system of claim 10, wherein the processor is further configured to:
    train a template machine learning model on a template data set; and
    transmit the template machine learning model to the first client computing device and the second client computing device, wherein:
      the first private artificial intelligence model is a first copy of the template machine learning model that has been further trained on the first private data set; and
      the second private artificial intelligence model is a second copy of the template machine learning model that has been further trained on the second private data set.

17. The computing system of claim 10, wherein the adaptive co-distillation model is trained at least in part via supervised learning.

18. A method for use with a computing device, the method comprising:
    inputting an input data set into a first private artificial intelligence model that has been generated using a first private data set and a second private artificial intelligence model that has been generated using a second private data set;
    receiving a first result data set from the first private artificial intelligence model as a result of applying the first private artificial intelligence model to the input data set, wherein the first result data set includes a plurality of first classification labels;
    receiving a second result data set from the second private artificial intelligence model as a result of applying the second private artificial intelligence model to the input data set, wherein the second result data set includes a plurality of second classification labels;
    in a first training phase, training an adaptive co-distillation model with the input data set as an input and the first result data set as a first target output, wherein:

in at least the first training phase, the adaptive co-distillation model is trained using a training algorithm that utilizes a weighted loss function; and
the weighted loss function weights loss between a predicted output of the adaptive co-distillation model and the first result data set by a weighting factor that is based on one or more of:
a data distance between an element in the input data set and the first private data set as determined by a first similarity algorithm;
a confidence value in the first result data set; and
a human-specified input;
in a second training phase, further training the adaptive co-distillation model with the input data set as the input and the second result data set as a second target output, wherein the adaptive co-distillation model is not trained on the first private data set or the second private data set;
receiving a runtime data set including a plurality of runtime input data entries; and
for each of the plurality of runtime input data entries, outputting a runtime classification label selected from a combined classification label set including the plurality of first classification labels and the plurality of second classification labels.

* * * * *